United States Patent
Robert Jose et al.

(10) Patent No.: US 12,314,376 B2
(45) Date of Patent: May 27, 2025

(54) ADAPTIVE BIOMETRIC AUTHENTICATION

(71) Applicant: Adeia Guides Inc., San Jose, CA (US)

(72) Inventors: Jeffry Copps Robert Jose, Tamil Nadu (IN); Ankur Anil Aher, Maharashtra (IN)

(73) Assignee: ADEIA GUIDES INC., San Jose, CA (US)

( * ) Notice: Subject to any disclaimer, the term of this patent is extended or adjusted under 35 U.S.C. 154(b) by 0 days.

(21) Appl. No.: 18/376,701

(22) Filed: Oct. 4, 2023

(65) Prior Publication Data
US 2024/0028699 A1    Jan. 25, 2024

Related U.S. Application Data

(63) Continuation of application No. 17/188,504, filed on Mar. 1, 2021, now Pat. No. 11,809,546.

(51) Int. Cl.
*G06F 21/32* (2013.01)
*G06F 21/45* (2013.01)

(52) U.S. Cl.
CPC ............. *G06F 21/45* (2013.01); *G06F 21/32* (2013.01)

(58) Field of Classification Search
CPC ................................. G06F 21/45; G06F 21/32
See application file for complete search history.

(56) References Cited

U.S. PATENT DOCUMENTS

| | | | |
|---|---|---|---|
| 2014/0096210 A1* | 4/2014 | Dabbiere | H04L 63/0861 726/5 |
| 2017/0286648 A1* | 10/2017 | Yamaguchi | G06F 21/316 |
| 2019/0147151 A1* | 5/2019 | Scopis | H04L 63/0861 382/118 |
| 2022/0277070 A1 | 9/2022 | Robert Jose et al. | |

OTHER PUBLICATIONS

Pisani, Paulo Henrique, et al., "Adaptive Biometric Systems", ACM Computing Surveys, ACM, New York, NY, US, vol. 52, No. 5, pp. 1-38, Sep. 13, 2019.

\* cited by examiner

*Primary Examiner* — Towfiq Elahi
(74) *Attorney, Agent, or Firm* — HALEY GUILIANO LLP

(57) ABSTRACT

Systems and methods are presented for adaptive biometric authentication. According to one example method, a failure of a first type of biometric authentication is detected. In response to detecting the failure of the first type of biometric authentication, an alternative type of authentication is completed. In response to completing the alternative type of authentication, a biometric characteristic of a biometric signature is selectively modified in a stored user profile for processing a subsequent attempt of the first type of biometric authentication.

19 Claims, 13 Drawing Sheets

1000a

| Biometric Signature Characteristic (1002a) | Stored Characteristic Value (1004a) | Characteristic Status for Authentication (1006a) |
|---|---|---|
| Pitch | 160 Hz | Available |
| Accent | New England | Available |
| Pace | 140 Words Per Minute | Available |
| Breathing Pattern | 15 Breaths Per Minute | Available |
| Word Emphasis | No Emphasis | Available |
| Cadence | 4 Syllables Per Second | Available |

| Biometric Input Characteristic (1008) | Received Input Characteristic Value (1010) | Biometric Input Characteristic (1002b) | Stored Characteristic Value (1004b) | Characteristic Status for Authentication (1006b) |
|---|---|---|---|---|
| Pitch | 120 Hz | Pitch | 160 Hz | Suppressed |
| Accent | Unknown | Accent | New England | Suppressed |
| Pace | 140 Words Per Minute | Pace | 140 Words Per Minute | Available |
| Breathing Pattern | 15 Breaths Per Minute | Breathing Pattern | 15 Breaths Per Minute | Available |
| Word Emphasis | No Emphasis | Word Emphasis | No Emphasis | Available |
| Cadence | 1 Syllables Per Second | Cadence | 4 Syllables Per Second | Suppressed |

FIG. 10B

| Biometric Signature Characteristic | Stored Characteristic Value | Received Input Characteristic Value | Difference |
|---|---|---|---|
| Pitch | 160 Hz | 120 Hz | -40 Hz |
| Accent | New England | Unknown | No Match |
| Pace | 140 Words Per Minute | 140 Words Per Minute | 0 |
| Breathing Pattern | 15 Breaths Per Minute | 15 Breaths Per Minute | 0 |
| Word Emphasis | No Emphasis | No Emphasis | Match |
| Cadence | 4 Syllables Per Second | 1 Syllable Per Second | -3 Syllable Per Second |

FIG. 11

| Biometric Signature Characteristic | Stored Characteristic Value | Received Input Characteristic Value | Difference | Threshold Value | Characteristic Status For Authentication |
|---|---|---|---|---|---|
| Pitch | 160 Hz | 120 Hz | - 40 Hz | \|20 Hz\| | Suppressed |
| Accent | New England | Unknown | No Match | No Match | Suppressed |
| Pace | 140 Words Per Minute | 140 Words Per Minute | 0 | \|20 Words Per Minute\| | Available |
| Breathing Pattern | 15 Breaths Per Minute | 15 Breaths Per Minute | Match | \|5 Breaths Per Minute\| | Available |
| Word Emphasis | No Emphasis | No Emphasis | Match | No Match | Available |
| Cadence | 4 Syllables Per Second | 1 Syllable per Second | - 3 Syllables Per Second | \|2 Syllables Per Second\| | Suppressed |

| 1302 Biometric Input Characteristic | 1304 Received Input Characteristic Value |
|---|---|
| Pitch | 120 Hz |
| Accent | Unknown |
| Pace | 140 Words Per Minute |
| Breathing Pattern | 15 Breaths Per Minute |
| Word Emphasis | No Emphasis |
| Cadence | 1 Syllables Per Second |

| 1306 Biometric Signature Characteristic | 1308 Stored Characteristic Value | 1310 Threshold Value | 1312 Stored Weight |
|---|---|---|---|
| Pitch | 160 Hz | \| 20 Hz \| | 0.3 |
| Accent | New England | No Match | 0.2 |
| Pace | 140 Words Per Minute | \| 20 Words Per Minute \| | 0.2 |
| Breathing Pattern | 15 Breaths Per Minute | \| 5 Breaths Per Minute \| | 0.1 |
| Word Emphasis | No Emphasis | No Match | 0.1 |
| Cadence | 4 Syllables Per Minute | \| 2 Syllables Per Second \| | 0.1 |

| 1314 Biometric Signature Characteristic | 1316 Difference |
|---|---|
| Pitch | - 40 Hz |
| Accent | No Match |
| Pace | 0 |
| Breathing Pattern | 0 |
| Word Emphasis | Match |
| Cadence | -3 Syllables Per Second |

| 1318 Modified Biometric Signature Characteristic | 1320 Stored Characteristic Value | 1322 Stored Weight |
|---|---|---|
| Pitch | 160 Hz | 0 |
| Accent | New England | 0 |
| Pace | 140 Words Per Minute | 0.2 |
| Breathing Pattern | 15 Breaths Per Minute | 0.1 |
| Word Emphasis | No Emphasis | 0.1 |
| Cadence | 4 Syllables Per Second | 0 |

FIG. 13

ADAPTIVE BIOMETRIC AUTHENTICATION

CROSS-REFERENCE TO RELATED APPLICATION

This application is a continuation of U.S. patent application Ser. No. 17/188,504, filed Mar. 1, 2021, which is hereby incorporated by reference herein in its entirety.

BACKGROUND

The present disclosure is directed to biometric authentication, and more particularly, to systems and methods for adaptive biometric authentication that accommodate one or more varying biometric characteristics.

SUMMARY

Current systems enable a user to log in to a user profile or provide commands once authentication of the user is completed, for instance, by comparing a biometric input to a biometric signature stored in a corresponding user profile. The biometric signature may be associated with an individual user and include various characteristics depending on the nature of the biometric signature (e.g., voice signatures may be defined by parameters such as pitch, tone, accent, or others). Additionally, these systems may track inputs provided by a particular user and may update a biometric signature by continuously collecting samples of the user's biometric input to ensure slight variations in the user's input still enable a user to log in and have their user preferences, associated with the user profile, updated based on recent user activity. A user's biometric input may temporarily change for a variety of reasons, which affects the ability of a biometric authentication system to authenticate the user by a biometric signature.

In view of the foregoing, systems and methods are described for adaptive biometric authentication that accommodates one or more varying biometric characteristics. The systems and methods herein, for instance, enable biometric authentication to be successfully completed despite a biometric input that has been, at least temporarily, modified in some manner. For example, a voice-based biometric input may be altered as a result of an illness or some injury that changes a corresponding pitch, tone, and/or breathing pattern. In another example, a voice-based biometric input may include an accent that is no longer detectable as a result of some form of temporary condition such as an illness. The biometric input may be camera-based and may be utilized to authenticate a user's identity based on a picture of the user's face. In this example, a user's face may be partially concealed either with a scarf to accommodate weather conditions or with a mask to accommodate a sort of health regulation mandate. In another example, the user may utilize a retinal image for the camera-based biometric input. In this example, a user may have different colored or shaped contact lenses that they use for a single event. The biometric input may also be touch based, which would utilize either a handprint or fingerprint for performing the biometric authentication. In this example, a user may have dirt, a cut, or a bandage which may obscure a portion of the finger or hand when the user attempts to provide an adequate biometric input.

A system receives a biometric input (e.g., a voice pattern, an image capture of a face, or a fingerprint). A failure of a first type of biometric authentication is detected. For example, this may be determined by comparing biometric characteristics of the biometric input to at least one stored biometric signature. In this example, the biometric characteristics of the biometric input may not match or may not be within a threshold similarity value to the respective biometric characteristics of a stored biometric signature to enable biometric authentication of the source of the biometric input. In response to detecting the failure of the first type of biometric authentication, a user is prompted to complete an alternative type of authentication (e.g., if a voice-based authentication fails and the system determines another form of authentication has been enabled by the stored user profile such as a username and password entry, the user is prompted to enter the username and password corresponding to the stored user profile).

Once the user completes the alternative type of authentication, a comparison between the biometric characteristics of the biometric input and the respective biometric characteristics of the biometric signature corresponding the stored user profile, for which the alternative authentication was successfully completed, is performed. For example, at least one biometric characteristic may be determined to be different between the biometric input and the biometric signature based on the comparison (e.g., the biometric input may be a voice-based input and the pitch of the biometric input is different from the pitch of the stored voice-based biometric signature). In response to determining at least one biometric characteristic if different, the at least one biometric characteristic that is determined to be different is selectively modified in the biometric signature for processing a subsequent attempt of the first type of biometric authentication.

Subsequent biometric inputs provided by the user corresponding to the stored user profile will be continuously monitored in order. After a transient period of time, either by information directly provided by the user or by an analysis of a subsequent biometric input, it will be determined that the biometric characteristic, that was selectively modified in the biometric signature corresponding to the stored user profile, can be produced by the user in the unmodified format. Based on the determining, the biometric signature corresponding to the stored user profile will return to the state it was prior to the selective modification of the biometric characteristic by reversing the modification of the biometric characteristic in the stored biometric signature performed after detecting the initial failure of the first type of biometric authentication.

These techniques solve the problems of other approaches described above. In particular, this approach does not utilize the biometric input that led to the failure of the first type of biometric authentication as data that contributes to a permanent adaptation of the biometric characteristics of the biometric signature for the stored user profile. Instead, the biometric characteristic that cannot be provided in a state that enables a successful biometric authentication is selectively modified in a stored biometric signature until it is determined that the biometric characteristic can once again be provided in a state that enables successful completion of the biometric authentication. Thus, the selective modification is transient and reversable without preventing a user from being able to utilize a particular form of biometric authentication.

Additionally, this approach does not require a user to generate a new biometric signature to continue using a particular form of biometric authentication, nor does it require a user to create a new profile corresponding to a new biometric signature. By continuously reviewing a plurality of data from a variety of sources that may indicate the source of biometric input corresponding to the biometric signature has returned to an original state, the current association between a previously used biometric signature and a stored user profile is retained. The approach also addresses the deficiencies in relying on a set list of biometric characteristics of a biometric signature, as opposed to adapting a set of biometric characteristics of a biometric signature based on a user's ability to provide the biometric characteristics by a biometric input as enabled by the systems and methods described herein.

In some embodiments, detecting the failure of the first type of biometric authentication includes comparing the biometric characteristic of the biometric input signal to the biometric characteristics of the biometric signature in the stored user profile and determining, based on the comparing, that the biometric characteristic of the biometric input signal is below a threshold similarity value of the biometric characteristic of the biometric signature in the stored user profile. The threshold similarity value may be a stored number, based on the units of measurement corresponding to a particular biometric characteristic. The stored number may correspond to a difference or may correspond to a particular minimum value. Certain biometric characteristics may not have units of measurement associated with their descriptive attributes and may be assigned a binary threshold. The binary threshold indicates that the biometric characteristic of the biometric input either matches or does not match the corresponding biometric characteristic of the biometric input (e.g., an accent of a provided voice sample either will or will not match an accent of a stored voice signature).

In some embodiments, it may be determined an alternative authentication method has been enabled on a device that corresponds to the stored user profile. The alternative authentication method may be a different type of biometric authentication (e.g., a voice authentication failed, and a fingerprint authentication is also enabled). The alternative authentication method may be a type of authentication that does not require a biometric input (e.g., entering a username and a corresponding password). In some embodiments, the control circuitry (e.g., control circuitry 408 of FIG. 4) may default to the non-biometric authentication as an alternative once the failure of the first type of biometric authentication is detected. Once the failure of the first type of biometric authentication is detected, a prompt may be generated informing the user of the failure of the first type of biometric authentication, and it may also provide instruction regarding the need for an alternative form of authentication to be completed to access the stored user profile.

In some embodiments, selectively modifying, in the stored user profile, the biometric characteristic of the biometric signature for processing the subsequent attempt of the first type of biometric authentication includes modifying an emphasis factor corresponding to the one or more of the biometric characteristics of the biometric signature selected for modification. The emphasis factor may correspond to weight that a particular biometric characteristic has in determining if the biometric authentication can be completed based on a biometric input. In some embodiments, modifying the emphasis factor may be completed by setting the emphasis factor to a value of zero to prevent the biometric characteristic from being used as part of the biometric authentication analysis.

In some embodiments, a confidence value may be utilized to verify that a particular user's ability to provide a particular biometric input has been compromised. A plurality of data associated with a stored user profile may be accessed to search for information indicating a status of a biometric input (e.g., calendar data or messages related to a trip to a doctor or clarifying statements about a user's voice being altered). Based on the plurality of data, the confidence value may be generated that corresponds to a biometric characteristic of a biometric signature. The confidence value indicates a probability that utilizing the biometric characteristic would cause the first type of biometric authentication to fail based on an inability to determine that a biometric input is similar enough to or matches the biometric signature.

In some embodiments, the confidence value may be compared to a threshold confidence value. For example, the threshold confidence value, if matched or exceeded, results in a determination that the first type of biometric authentication cannot be completed. In some embodiments, the threshold confidence value may be tiered between a minimum and a maximum value. For example, if the confidence value generated based on the plurality of data corresponding to the stored user profile matches or exceeds the minimum value, the user may be prompted to provide confirmation that the user in incapable of providing a biometric input that enables completion of the first type of biometric authentication. Additionally, if the confidence value generated based on the plurality of data corresponding to the stored user profile matches or exceeds the maximum value, a prompt may be generated requesting entry of an alternative input signal to perform an alternative type of authentication.

In some embodiments, a confirmation prompt may be generated, after a predetermined period of time, requesting user confirmation that the biometric characteristic of the biometric signature can be provided in its state prior to the detected failure. In response to receiving a confirmation from the user that the biometric characteristic of the biometric signature can once again be provided in its state prior to the detected failure, the biometric characteristic of the biometric signature may be returned to its state prior to the selective modification for processing a third attempt of the first type of biometric authentication.

In some embodiments, a probability that utilizing the biometric characteristic would cause the first type of biometric authentication to be successfully completed may be determined. In response to the determining, the biometric characteristic of the biometric signature may be returned to its state prior to the selective modification for processing a third attempt of the first type of biometric authentication. In some embodiments, the probability may be determined by comparing one or more biometric characteristics of a subsequent biometric input signal to one or more respective biometric characteristics of a biometric signature in the stored user profile. In some embodiments, the comparison involves a comparison to a threshold similarity value, as with the initial comparison for detecting the failure of the biometric authentication. If the threshold similarity is matched or exceeded, the modification of the biometric characteristic corresponding to the biometric signature may be reversed.

In some embodiments a plurality of data associated with the stored user profile may be retrieved and may be used to generate a subsequent confidence value. For example, the confidence value can indicate a probability that utilizing the biometric characteristic would cause the first type of biometric authentication to fail. The subsequent confidence value may be compared to a threshold confidence value. If the subsequent confidence value is less than the threshold confidence value, the biometric characteristic of the biometric signature may be returned to its state prior to the selective modification for processing a third attempt of the first type of biometric authentication. In some embodiments, the threshold confidence value may be tiered and exceeding the maximum value results in a prompt being generated for the user to confirm the biometric characteristic can be returned while only exceeding minimum value results in the reversion occurring automatically.

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which:

FIG. 10A is an illustrative example data structure of a biometric signature, in accordance with some embodiments of the disclosure;

FIG. 10B is an illustrative example of how the biometric signature of FIG. 10A may be selectively modified based on received biometric input characteristics, in accordance with some embodiments of the disclosure;

FIG. 11 is an illustrative example of a comparison of biometric input characteristics to a stored biometric signature, in accordance with some embodiments of the disclosure;

FIG. 12 is an illustrative example of a threshold-based comparison of received biometric input characteristics and corresponding stored biometric characteristics of a biometric signature, in accordance with some embodiments of the disclosure; and FIG. 13 is an illustrative example of a collection of how weights of biometric characteristics of a biometric signature may be modified, in accordance with some embodiments of the disclosure.

DETAILED DESCRIPTION

Methods and systems are provided herein for adaptive biometric authentication. The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, random access memory (RAM), etc.

Figure 1:
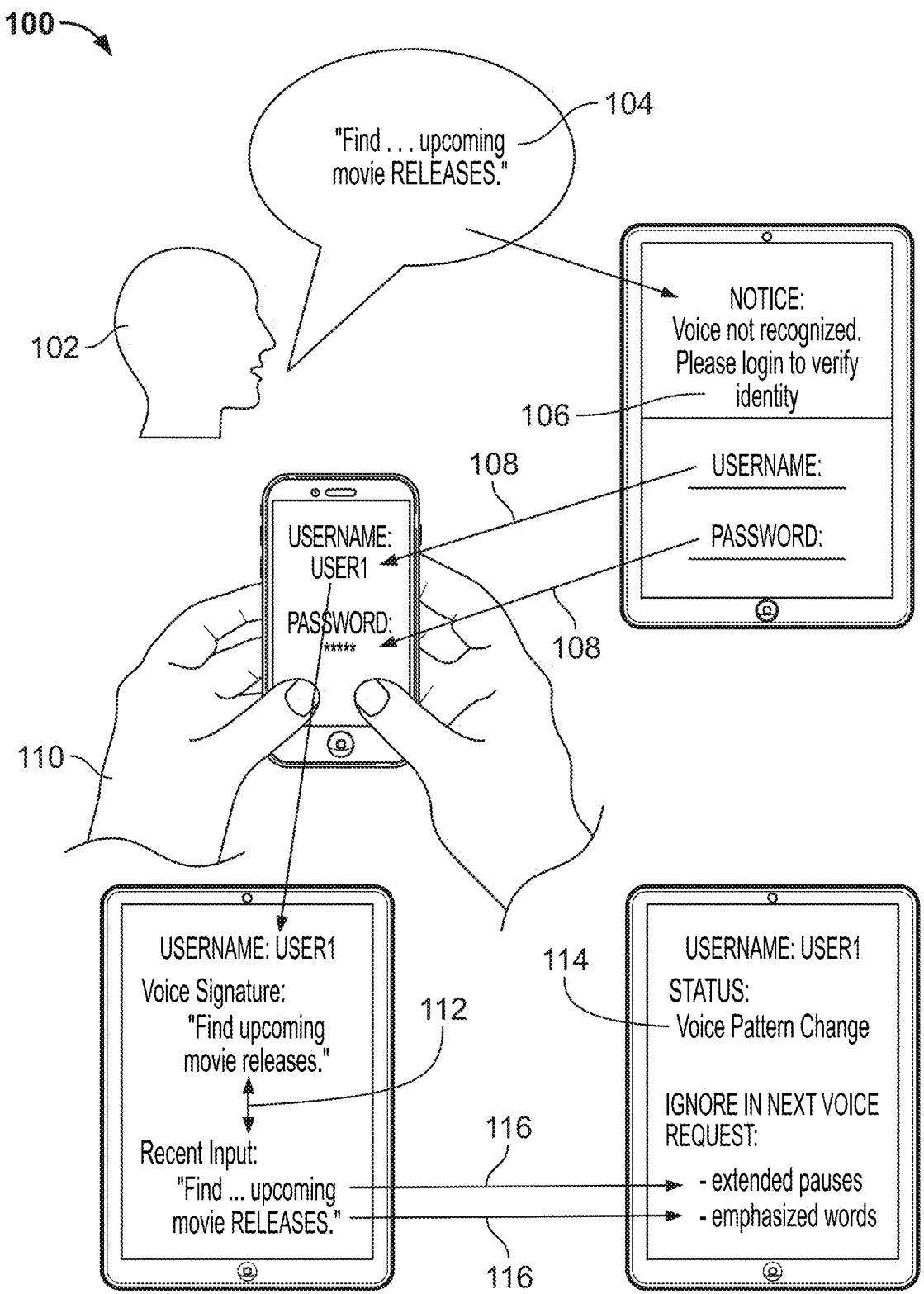
FIG. 1 illustrates an example scenario in which adaptive biometric authentication is implemented based on an audio input, in accordance with some embodiments of the disclosure.

FIG. 1 depicts a scenario 100 in which adaptive biometric authentication is implemented based on an audio input, in accordance with some exemplary embodiments. In some embodiments, one or more parts of or the entirety of the interactive system is configured as a system implementing various features, processes, and components of FIGS. 2-13. Although FIG. 4 shows a certain number of components, in various examples, the interactive system may include fewer than the illustrated number of components and/or multiples of one or more of the illustrated number of components.

Biometric authentication scenario 100 is configured to receive inputs from user 102. User 102 speaks a phrase, such as audio pattern 104, that may provide an inquiry or command to commence biometric authentication scenario 100. In some embodiments, audio pattern 104 may be any of an activation phrase, an inquiry, a command, or a request that may trigger biometric authentication scenario 100 to process audio 104 for the purposes of identifying a particular user identity and determine if there is a stored user profile or user preferences associated with a particular user identity. For example, audio pattern 104 may be a command-based inquiry such as, "Find . . . upcoming movie RELEASES." In this example, audio pattern 104 includes a collection of characteristics including pauses and word emphasis. In some embodiments, biometric authentication scenario 100 may consider one or both of at least these characteristics when performing an audio input based biometric authentication (e.g., biometric authentication process 600 of FIG. 6).

In the event biometric authentication scenario 100 detects a failure of a first type of biometric authentication, notice 106 is generated which informs the user that the first type of biometric authentication failed and prompts the user to provide credentials 108. For example, credentials 108 may include any implemented alternative authentication method that user 102 enabled in their stored user profile. In some embodiments, control circuitry (e.g., control circuitry 408 of FIG. 4) may prompt a second biometric authentication for receiving credentials 108 (e.g., a fingerprint or a face image). In some embodiments, the control circuitry may prompt a nonbiometric authentication for receiving credentials 108 (e.g., a username and password authentication). In some embodiments, the control circuitry may determine which alternative authentication method to prompt the user to try based on biometric authentication process 500 of FIG. 5 or biometric authentication process 800 of FIG. 8.

Once the user is prompted to enter credentials 108, the user completes alternative authentication 110 by entering the requested credentials. After the user enters credentials 108, the control circuitry determines a stored user profile corresponding to credentials 108 (e.g., USER1). The control circuitry then retrieves a biometric signature corresponding to the first type of biometric authentication that failed and the user profile corresponding to credentials 108. Once the biometric signature is retrieved, the control circuitry completes comparison 112 between the retrieved biometric signature (e.g., a voice based biometric signature) and audio pattern 104. In some embodiments, the comparison may be executed by biometric authentication process 600 of FIG. 6, as depicted by FIGS. 10A-13.

The control circuitry determines, based on the comparison, status 114 of the biometric signature corresponding to the verified stored user profile. For example, status 114 may indicate there is a "Voice Pattern Change" for the biometric signature used to authenticate a stored user profile based on audio inputs such as audio pattern 104. The control circuitry determines, based on the comparison, that characteristics 116 cannot be provided in a manner that enables authentication based on the stored biometric signature. In response to this determination, the control circuitry selectively modifies the stored biometric signature such that characteristics 116 are not considered as part of a subsequent authentication attempt of the first type of biometric authentication.

In some embodiments, selectively modifying, in the stored user profile, characteristics 116 of the biometric signature for processing the subsequent attempt of the first type of biometric authentication includes modifying an emphasis factor corresponding to the one or more of characteristics 116 of the biometric signature selected for modification as depicted in modification process 1300 of FIG. 13. The emphasis factor may correspond to weight that a particular biometric characteristic of characteristics 116 has in determining if the biometric authentication can be completed based on a biometric input. In some embodiments, modifying the emphasis factor may be completed by setting the emphasis factor to a value of zero to prevent characteristics 116 from being used as part of the biometric authentication analysis. In some embodiments, selectively modifying may include suppressing characteristics 116 without the use of an emphasis factor. In some embodiments, selectively modifying may include redistributing the value of an emphasis factor among the remaining characteristics such that the previous weight assigned to characteristics 116 is now applied to the remaining characteristics for a subsequent authentication attempt of the first type of biometric authentication.

Figure 2:
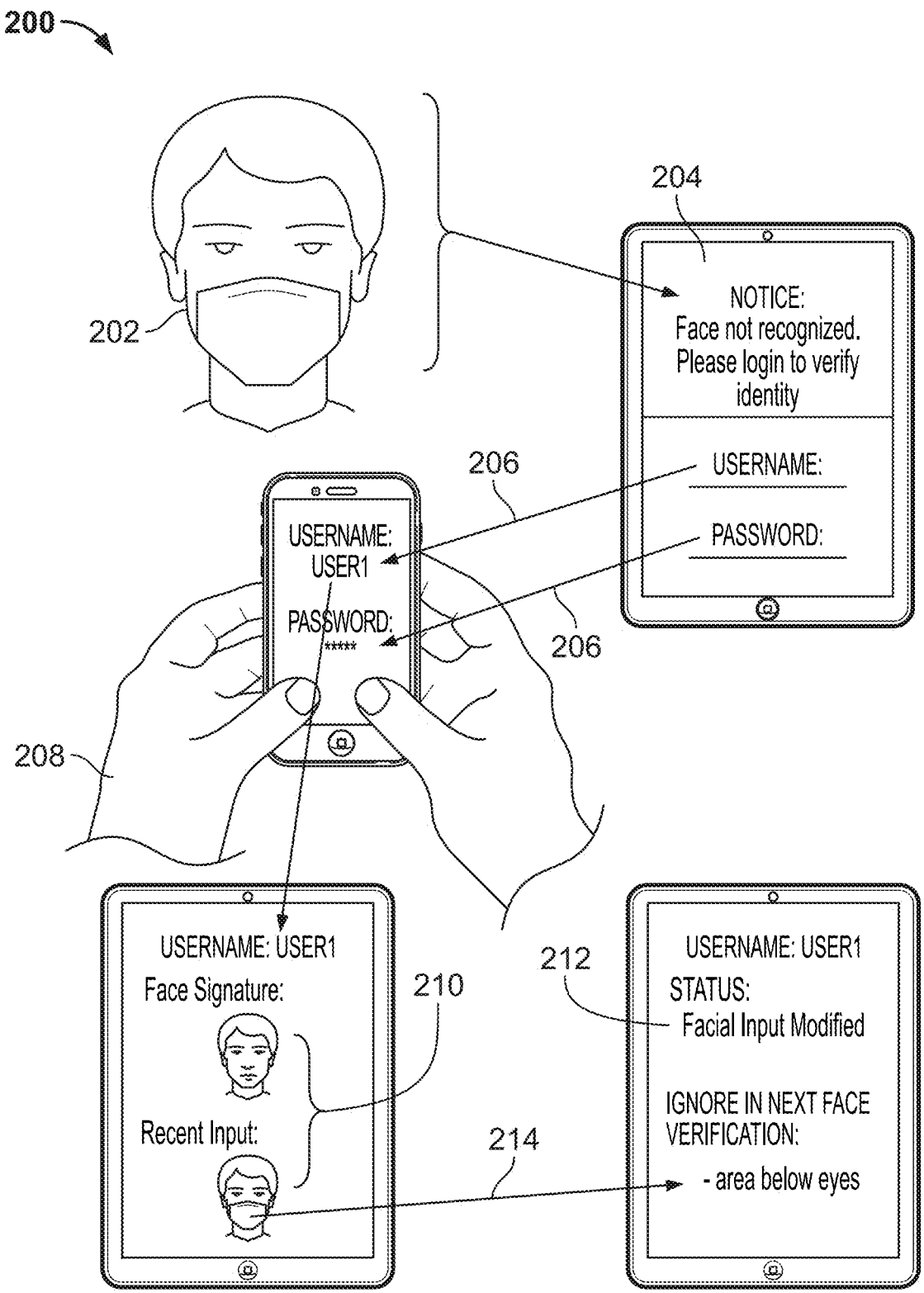
FIG. 2 illustrates an example scenario in which adaptive biometric authentication is implemented based on a camera-based input, in accordance with some embodiments of the disclosure.

FIG. 2 depicts biometric authentication scenario 200 where a biometric authentication is attempted based on a camera-sourced input, in accordance with some embodiments of the disclosure. In some embodiments, one or more parts of or the entirety of the interactive system may be configured as a system implementing various features, processes, and components of FIGS. 1 and 3-13. Although FIG. 4 shows a certain number of components, in various examples, the interactive system may include fewer than the illustrated number of components and/or multiples of one or more of the illustrated number of components.

FIG. 2 depicts a scenario 200 in which adaptive biometric authentication is implemented based on a camera-based input, in accordance with some exemplary embodiments. Biometric authentication scenario 200 includes receiving camera-based inputs from user 202. User 202 presents their face which for a facial recognition authentication. In some embodiments, user 202 may present an individual aspect of their face for authentication such as an eye. The face of user 202 may be obstructed by an object, such as a mask or scarf, which inhibits biometric authentication scenario 200 from completing a camera-based authentication process. In some embodiments, a form of authentication may be required for the purposes of identifying a particular user identity and determine if there is a stored user profile or user preferences associated with a particular user identity. In this example, the face of user 202 includes a collection of characteristics including attributes of the hair of user 202, the eyes of user 202, the ears of user 202. In some embodiments, biometric authentication scenario 200 may consider some or all of at least these characteristics when performing a camera-based biometric authentication (e.g., biometric authentication process 600 of FIG. 6).

In the event biometric authentication scenario 200 detects a failure of a first type of biometric authentication, notice 204 is generated which informs the user that the first type of biometric authentication failed and prompts the user to provide credentials 206. In this example, biometric authentication scenario 200 detects a failure based on an inability to see additional characteristics of the face of user 202 besides attributes of the hair of user 202, the eyes of user 202, the ears of user 202. Biometric authentication scenario 200 requires additional data from characteristics below the eyes of user 202, such as characteristics corresponding to the nose, mouth and chin of user 202 to successfully authenticate user 202 based on this camera-based input.

Credentials 206 may include any implemented alternative authentication method that user 202 enabled in their stored user profile. In some embodiments, control circuitry (e.g., control circuitry 408 of FIG. 4) may prompt a second biometric authentication for receiving credentials 206 (e.g., a voice pattern or a fingerprint). In some embodiments, the control circuitry may prompt a nonbiometric authentication for receiving credentials 206 (e.g., a username and password authentication). In some embodiments, the control circuitry may determine which alternative authentication method to prompt the user to try based on biometric authentication process 500 of FIG. 5 or biometric authentication process 800 of FIG. 8.

Once the user is prompted to enter credentials 206, the user completes alternative authentication 208 by entering the requested credentials. After the user enters credentials 206, the control circuitry identifies a stored user profile corresponding to credentials 206 (e.g., USER1). The control circuitry then retrieves a biometric signature corresponding to the first type of biometric authentication that failed and the user profile corresponding to credentials 206. Once the biometric signature is retrieved, the control circuitry completes comparison 210 between the retrieved biometric signature and the recent input of the face of user 202. In some embodiments, the comparison may be executed by biometric authentication process 600 of FIG. 6, as depicted by FIGS. 10A-13.

The control circuitry determines, based on the comparison, status 212 of the biometric signature corresponding to the verified stored user profile. For example, status 212 may indicate "Facial Input Modified" for the biometric signature used to authenticate a stored user profile based on the recent input of the face of user 202. The control circuitry determines, based on the comparison, that characteristics 214 cannot be provided in a manner that enables authentication based on the stored biometric signature. In response to this determination, the control circuitry selectively modifies the stored biometric signature such that characteristics 214 are not considered as part of a subsequent authentication attempt of the first type of biometric authentication.

In some embodiments, selectively modifying, in the stored user profile, characteristics 214 of the biometric signature for processing the subsequent attempt of the first type of biometric authentication includes modifying an emphasis factor corresponding to the one or more of characteristics 214 of the biometric signature selected for modification as depicted in modification process 1300 of FIG. 13. The emphasis factor may correspond to weight that a particular biometric characteristic of characteristics 214 has in determining if the biometric authentication can be completed based on a biometric input. In some embodiments, modifying the emphasis factor may be completed by setting the emphasis factor to a value of zero to prevent characteristics 214 from being used as part of the biometric authentication analysis. In some embodiments, selectively modifying may include suppressing characteristics 214 without the use of an emphasis factor. In some embodiments, selectively modifying may include redistributing the value of an emphasis factor among the remaining characteristics such that the previous weight assigned to characteristics 214 is now applied to the remaining characteristics for a subsequent authentication attempt of the first type of biometric authentication. In this example, the features of user 202 below the eyes may not be considered for subsequent attempts to authenticate the identity of user 202 based on this camera-based authentication method.

Figure 3:
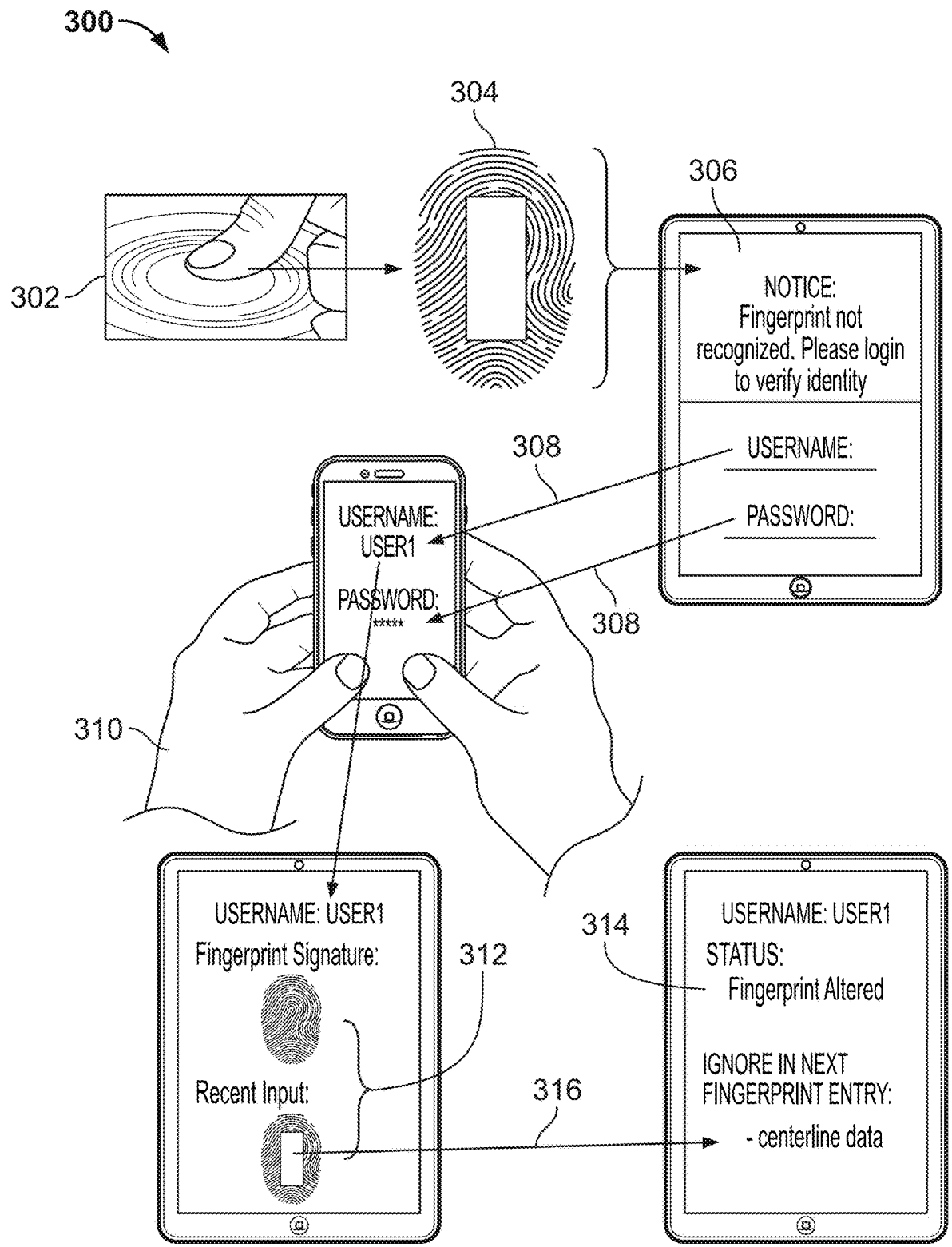
FIG. 3 illustrates an example scenario in which adaptive biometric authentication is implemented based on a touch-based input, in accordance with some embodiments of the disclosure.
Figure 4:
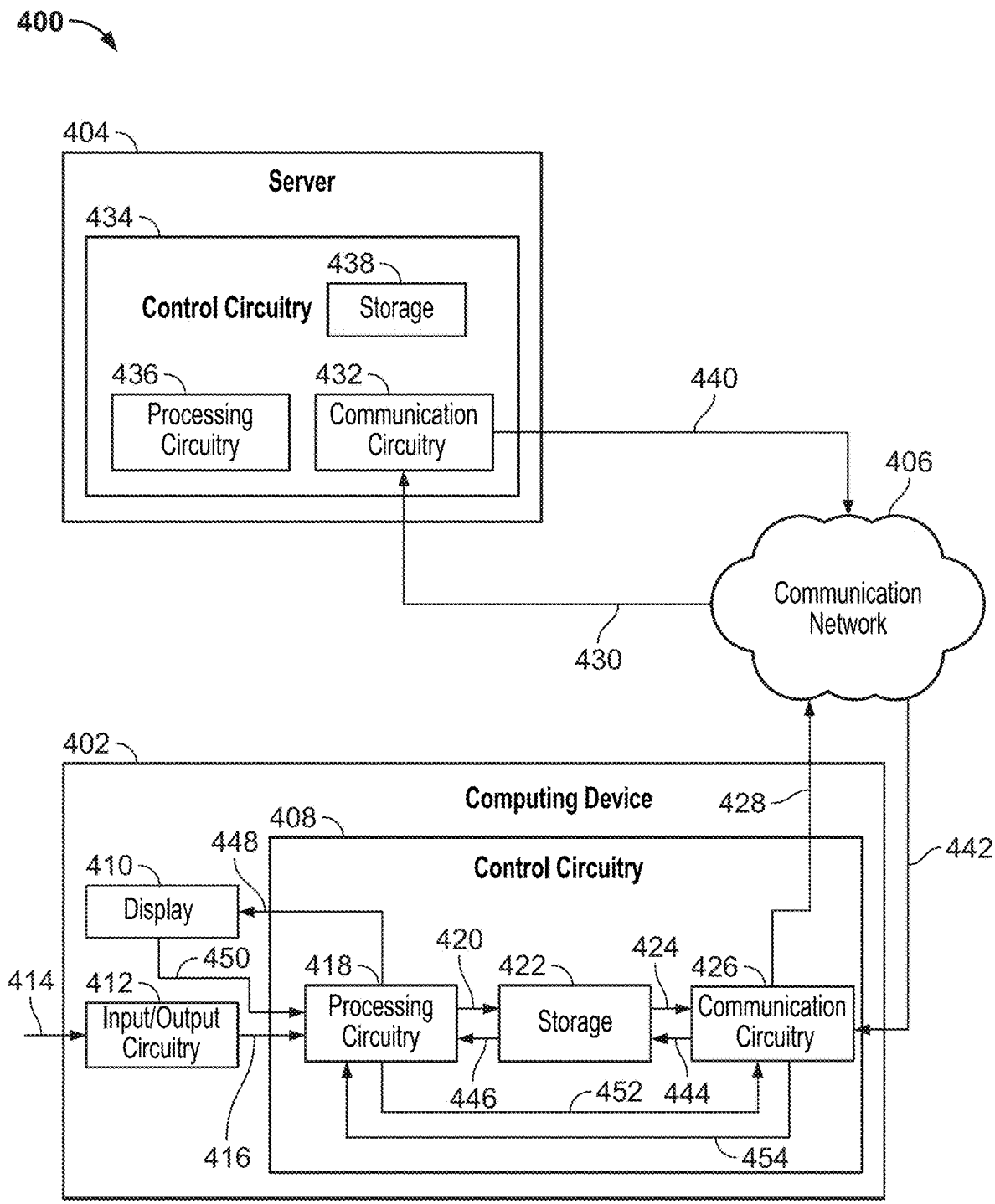
FIG. 4 is a block diagram representing an example adaptive biometric authentication system, in accordance with some embodiments of the disclosure.

FIG. 3 depicts a scenario 300 in which adaptive biometric authentication is implemented based on a touch-based input, in accordance with some embodiments of the disclosure. In some embodiments, one or more parts of or the entirety of the interactive system may be configured as a system implementing various features, processes, and components of FIGS. 1, 2 and 4-13. Although FIG. 4 shows a certain number of components, in various examples, the interactive system may include fewer than the illustrated number of components and/or multiples of one or more of the illustrated number of components.

Biometric authentication scenario 300 is configured to receive inputs from a user by touch interface 302. Touch interface 302 is utilized to provide a touch-based biometric input such as print 304. In some embodiments, print 304 may be substituted by a handprint or any of a plurality of touch-based inputs, such as a plurality of finger prints, which may trigger biometric authentication scenario 300 to process print 304 for the purposes of identifying a particular user identity and determining if there is a stored user profile or user preferences associated with a particular user identity. For example, print 304 may be a fingerprint. In this example, print 304 includes a collection of characteristics such as the shape and orientation of ridges in the print. In some embodiments, biometric authentication scenario 300 may consider some or all of at least these characteristics, and may consider relative values corresponding to these characteristics when performing touch-based biometric authentication (e.g., biometric authentication process 600 of FIG. 6).

In the event biometric authentication scenario 300 detects a failure of a first type of biometric authentication, notice 306 is generated, which informs the user that the first type of biometric authentication failed and prompts the user to provide credentials 308. For example, credentials 308 includes any implemented alternative authentication method that is enabled in their stored user profile. In some embodiments, control circuitry (e.g., control circuitry 408 of FIG. 4) may prompt a second biometric authentication for receiving credentials 308 (e.g., a voice pattern or a face image). In some embodiments, the control circuitry may prompt a nonbiometric authentication for receiving credentials 308 (e.g., a username and password authentication). In some embodiments, the control circuitry may determine which alternative authentication method to prompt the user to try based on biometric authentication process 500 of FIG. 5 or biometric authentication process 800 of FIG. 8.

Once the user is prompted to enter credentials 308, the user completes alternative authentication 310 by entering the requested credentials. After the user enters credentials 308, the control circuitry determines a stored user profile corresponding to credentials 308 (e.g., USER1). The control circuitry then retrieves a biometric signature corresponding to the first type of biometric authentication that failed and the user profile corresponding to credentials 308. Once the biometric signature is retrieved, the control circuitry completes comparison 312 between the retrieved biometric signature and print 304. In some embodiments, the comparison may be executed by biometric authentication process 600 of FIG. 6, as depicted by FIGS. 10A-13.

The control circuitry determines, based on the comparison, status 314 of the biometric signature corresponding to the verified stored user profile. For example, status 314 may indicate "Fingerprint Altered" for the biometric signature used to authenticate a stored user profile based on a touch-based input such as print 304. The control circuitry determines, based on the comparison, that characteristics 316 cannot be provided in a manner that enables authentication based on the stored biometric signature. In response to this determination, the control circuitry selectively modifies the stored biometric signature such that characteristics 316 are not considered as part of a subsequent authentication attempt of the first type of biometric authentication.

In some embodiments, selectively modifying, in the stored user profile, characteristics 316 of the biometric signature for processing the subsequent attempt of the first type of biometric authentication includes modifying an emphasis factor corresponding to the one or more of characteristics 316 of the biometric signature selected for modification as depicted in modification process 1300 of FIG. 13. The emphasis factor may correspond to weight that a particular biometric characteristic of characteristics 316 has in determining if the biometric authentication can be completed based on a biometric input. In some embodiments, modifying the emphasis factor may be completed by setting the emphasis factor to a value of zero to prevent characteristics 316 from being used as part of the biometric authentication analysis. In some embodiments, selectively modifying may include suppressing characteristics 316 without the use of an emphasis factor. In some embodiments, selectively modifying may include redistributing the value of an emphasis factor among the remaining characteristics such that the previous weight assigned to characteristics 316 is now applied to the remaining characteristics for a subsequent authentication attempt of the first type of biometric authentication. For example, if print 304 shows the center line of data from a fingerprint of a user cannot be reproduced to match a stored fingerprint that center line data may be suppressed or excluded from analysis of a subsequent fingerprint input for a subsequent attempt at a first type of biometric authentication.

FIG. 4 is a block diagram representing devices, components of each device, and data flow therebetween for biometric authentication system 400 for enabling biometric authentication, in accordance with some embodiments of the disclosure. For example, the biometric authentication may be used as a mechanism to enable a user to log in to a stored user profile, and access an application platform. The platform is configured based on user preferences that correspond to an authenticated user profile. Alternatively, the biometric authentication can be used to enable a system or application to record and store user activity for the purposes of updating a configuration of a user platform and/or providing recommendations for additional content and/or other configuration options. The interactive system is shown to include computing device 402, server 404, and a communication network 406. It is understood that while a single instance of a component may be shown and described relative to FIG. 4, additional instances of the component may be employed. For example, server 404 may include, or may be incorporated in, more than one server. Similarly, communication network 406 may include, or may be incorporated in, more than one communication network. Server 404 is shown communicatively coupled to computing device 402 through communication network 406. While not shown in FIG. 4, server 404 may be directly communicatively coupled to computing device 402, for example, in a system absent or bypassing communication network 406.

Communication network 406 may include one or more network systems, such as, without limitation, Internet, LAN, Wi-Fi or other network systems suitable for audio processing applications. In some embodiments, the system of FIG. 4 excludes server 404, and functionality that would otherwise be implemented by server 404 is instead implemented by other components of the system depicted by FIG. 4, such as one or more components of communication network 406. In still other embodiments, server 404 works in conjunction with one or more components of communication network 406 to implement certain functionality described herein in a distributed or cooperative manner. Similarly, in some embodiments, the system depicted by FIG. 4 excludes computing device 402, and functionality that would otherwise be implemented by computing device 402 is instead implemented by other components of the system depicted by FIG. 4, such as one or more components of communication network 406 or server 404 or a combination of the same. In other embodiments, computing device 402 works in conjunction with one or more components of communication network 406 or server 404 to implement certain functionality described herein in a distributed or cooperative manner.

Computing device 402 includes control circuitry 408, display 410 and input/output circuitry 412. Control circuitry 408 may be based on any suitable processing circuitry and includes control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Some control circuits may be implemented in hardware, firmware, or software. Control circuitry 408 in turn includes communication circuitry 426, storage 422 and processing circuitry 418. In some embodiments, computing device 402 or control circuitry 408 may be configured as varying embodiments, or combinations of varying embodiments, of biometric authentication scenario 100 of FIG. 1, biometric authentication scenario 200 of FIG. 2 and biometric authentication scenario 300 of FIG. 3 all configured to execute the various methods depicted in FIGS. 5-13.

In addition to control circuitry 408 and 434, computing device 402 and server 404 may each include storage (storage 422, and storage 438, respectively). Each of storages 422 and 438 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 422 and 438 may be used to store various types of content, metadata, and/or other types of data (e.g., they can be used to record audio questions asked by one or more participants connected to a conference). Non-volatile memory may also be used (e.g., to launch a boot-up routine and other instructions). Cloud-based storage may be used to supplement storages 422 and 438 or instead of storages 422 and 438. In some embodiments, a biometric input provided for the purposes of an authentication attempt or a biometric signature corresponding to a stored used profile or a stored user profile and corresponding user preferences may be stored in one or more of storages 422 and 438.

In some embodiments, control circuitry 408 and/or 434 executes instructions for an application stored in memory (e.g., storage 422 and/or storage 438). Specifically, control circuitry 408 and/or 434 may be instructed by the application to perform the functions discussed herein. In some implementations, any action performed by control circuitry 408 and/or 434 may be based on instructions received from the application. For example, the application may be implemented as software or a set of executable instructions that may be stored in storage 422 and/or 438 and executed by control circuitry 408 and/or 434. In some embodiments, the application may be a client/server application where only a client application resides on computing device 402, and a server application resides on server 404.

The application may be implemented using any suitable architecture. For example, it may be a stand-alone application wholly implemented on computing device 402. In such an approach, instructions for the application are stored locally (e.g., in storage 422), and data for use by the application is downloaded on a periodic basis (e.g., from an out-of-band feed, from an Internet resource, or using another suitable approach). Control circuitry 408 may retrieve instructions for the application from storage 422 and process the instructions to perform the functionality described herein. Based on the processed instructions, control circuitry 408 may determine a type of action to perform in response to input received from input/output circuitry 412 or from communication network 406. For example, in response to a user providing a biometric input as an attempt to complete a form of biometric authentication, control circuitry 408 may perform the steps of biometric authentication process 500 (FIG. 5), biometric authentication process 600 (FIG. 6), biometric authentication process 700 (FIG. 7), biometric authentication process 700 (FIG. 7), biometric authentication process 800 (FIG. 8), biometric authentication process 900 (FIG. 9), or processes relative to various embodiments, as depicted by but not limited to biometric authentication scenario 100 of FIG. 1, biometric authentication scenario 200 of FIG. 2, and biometric authentication scenario 300 of FIG. 3 including the comparison and suppression processes depicted in FIGS. 10A-13.

In client/server-based embodiments, control circuitry 408 may include communication circuitry suitable for communicating with an application server (e.g., server 404) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 406). In another example of a client/server-based application, control circuitry 408 runs a web browser that interprets web pages provided by a remote server (e.g., server 404). For example, the remote server may store the instructions for the application in a storage device. The remote server may process the stored instructions using circuitry (e.g., control circuitry 434) and/or generate displays. Computing device 402 may receive the displays generated by the remote server and may display the content of the displays locally via display 410. This way, the processing of the instructions is performed remotely (e.g., by server 404) while the resulting displays, such as the display windows described elsewhere herein, are provided locally on computing device 404. Computing device 402 may receive inputs from the user via input/output circuitry 412 and transmit those inputs to the remote server for processing and generating the corresponding displays. Alternatively, computing device 402 may receive inputs from the user via input/output circuitry 412 and process and display the received inputs locally, by control circuitry 408 and display 410, respectively.

Server 404 and computing device 402 may transmit and receive content and data such as media content via communication network 406. For example, server 404 may be a media content provider, and computing device 404 may be a smart television configured to download or stream media content, such as a live news broadcast, from server 404. Control circuitry 434, 408 may send and receive commands, requests, and other suitable data through communication network 406 using communication circuitry 432, 426, respectively. Alternatively, control circuitry 434, 408 may communicate directly with each other using communication circuitry 432, 426, respectively, avoiding communication network 406.

It is understood that computing device 402 is not limited to the embodiments and methods shown and described herein. In nonlimiting examples, computing device 402 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other device, computing equipment, or wireless device, and/or combination of the same capable of suitably displaying and manipulating media content.

Computing device 402 receives user input 414 at input/output circuitry 412. For example, computing device 402 may receive a user input such as a user swipe or user touch. In some embodiments, computing device 402 is a media device (or player) configured as biometric authentication scenario 100 of FIG. 1, biometric authentication scenario 200 of FIG. 2, and/or biometric authentication scenario 300 of FIG. 3 with the capability to execute any of the authentication methods described therein. It is understood that computing device 402 is not limited to the embodiments and methods shown and described herein.

User input 414 may be received from a user selection-capturing interface that is separate from device 402, such as a remote-control device, trackpad or any other suitable user movement-sensitive, audio-sensitive or capture devices, or as part of device 402, such as a touchscreen of display 410. Transmission of user input 414 to computing device 402 may be accomplished using a wired connection, such as an audio cable, USB cable, ethernet cable or the like attached to a corresponding input port at a local device, or may be accomplished using a wireless connection, such as Bluetooth, Wi-Fi, WiMAX, GSM, UTMS, CDMA, TDMA, 3G, 4G, 4G LTE, 5G, or any other suitable wireless transmission protocol. Input/output circuitry 312 may include a physical input port such as a 3.5 mm audio jack, RCA audio jack, USB port, ethernet port, or any other suitable connection for receiving audio over a wired connection, or may include a wireless receiver configured to receive data via Bluetooth, Wi-Fi, WiMAX, GSM, UTMS, CDMA, TDMA, 3G, 4G, 4G LTE, 5G, or other wireless transmission protocols.

Processing circuitry 418 may receive user input 414 from input/output circuitry 412 using communication path 416. Processing circuitry 418 may convert or translate the received user input 414 that may be in the form of audio data, visual data, gestures or movement to digital signals. In some embodiments, input/output circuitry 412 performs the translation to digital signals. In some embodiments, processing circuitry 418 (or processing circuitry 436, as the case may be) carries out disclosed processes and methods. For example, processing circuitry 418 or processing circuitry 436 may perform the steps of biometric authentication process 500 (FIG. 5), biometric authentication process 600 (FIG. 6), biometric authentication process 700 (FIG. 7), biometric authentication process 700 (FIG. 7), biometric authentication process 800 (FIG. 8), biometric authentication process 900 (FIG. 9), or processes relative to various embodiments, as depicted by but not limited to biometric authentication scenario 100 of FIG. 1, biometric authentication scenario 200 of FIG. 2, and biometric authentication scenario 300 of FIG. 3 including the comparison and suppression processes depicted in FIGS. 10A-13.

Processing circuitry 418 may provide requests to storage 422 by communication path 420. Storage 422 may provide requested information to processing circuitry 418 by communication path 446. Storage 422 may transfer a request for information to communication circuitry 426 which may translate or encode the request for information to a format receivable by communication network 406 before transferring the request for information by communication path 428. Communication network 406 may forward the translated or encoded request for information to communication circuitry 432, by communication paths 430.

At communication circuitry 432, the translated or encoded request for information, received through communication path 430, is translated or decoded for processing circuitry 436, which will provide a response to the request for information based on information available through control circuitry 434 or storage 438, or a combination thereof. The response to the request for information is then provided back to communication network 406 by communication path 440 in an encoded or translated format such that communication network 406 can forward the encoded or translated response back to communication circuitry 426 by communication path 442.

At communication circuitry 426, the encoded or translated response to the request for information may be provided directly back to processing circuitry 418 by communication path 454, or may be provided to storage 422 through communication path 444, which then provides the information to processing circuitry 418 by communication path 446. Processing circuitry 418 may also provide a request for information directly to communication circuitry 426 though communication path 452, where storage 426 responds to an information request, provided through communication path 420 or 444, by communication path 424 or 446 that storage 422 does not contain information pertaining to the request from processing circuitry 418.

Processing circuitry 418 may process the response to the request received through communication paths 446 or 454 and may provide instructions to display 410 for a notification to be provided to the users through communication path 448. Display 410 may incorporate a timer for providing the notification or may rely on inputs through input/output circuitry 412 from the user, which are forwarded through processing circuitry 418 through communication path 448, to determine how long or in what format to provide the notification. When display 410 determines the display has been completed, a notification may be provided to processing circuitry 418 through communication path 450.

The communication paths provided in FIG. 4 between computing device 402, server 404, communication network 406, and all subcomponents depicted are exemplary and may be modified to reduce processing time or enhance processing capabilities for each step in the processes disclosed herein by one skilled in the art.

Figure 5:
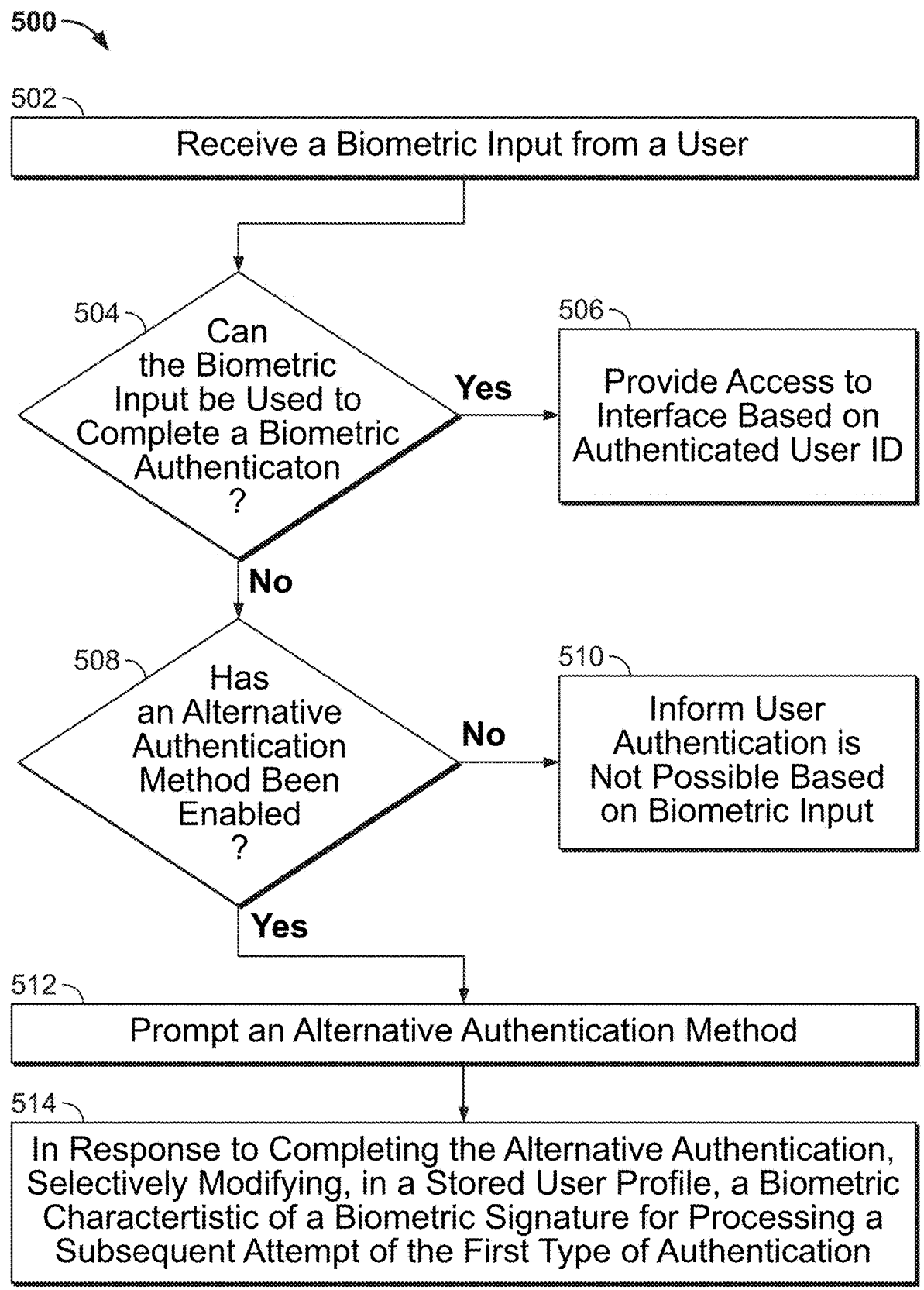
FIG. 5 is a flowchart representing an illustrative adaptive biometric authentication process, in accordance with some embodiments of the disclosure.

FIG. 5 depicts illustrative biometric authentication process 500 for enabling access to a stored user profile using a modified biometric signature despite an inability to generate a biometric input that enables authentication based on the stored biometric signature, in accordance with some disclosed methods and embodiments. For example, a user may provide a biometric input at 502 that is an audio input that may be used by one of the biometric authentication systems described herein for the purpose of attempting to authenticate a user identity in order to retrieve a stored user profile corresponding to the user identity. In other examples, the biometric input may be exemplified by any of the inputs provided and analyzed in FIGS. 1-3.

It should be noted that the process depicted in FIG. 5 or any step thereof could be performed on, or provided by, any device shown in FIG. 4 and can incorporate various user interfaces (e.g., on display 410 of FIG. 4). For example, the process depicted in FIG. 5 may be executed by control circuitry 408 (FIG. 4) of user equipment exemplified by computing device 402. In addition, one or more steps of the process depicted in FIG. 5 may be incorporated into or combined with one or more steps of any other process or embodiment (e.g., starting at process block 602 in biometric authentication process 600 of FIG. 6, starting at process block 702 in biometric authentication process 700 of FIG. 7, starting at process block 802 in biometric authentication process 800 of FIG. 8, starting at process block 902 in process 900 of FIG. 9 or utilizing the comparison and selective modification process exemplified by any or all of FIGS. 10A-13). In addition, FIGS. 1-3 provide depictions of exemplary embodiments of the processes described herein as executed by biometric authentication system 400.

At 502, a biometric input is received by the biometric authentication system for processing by the control circuitry (e.g., control circuitry 408 of FIG. 4) from a user. For example, the user may provide a voice pattern for audio-based biometric authentication, a face or retinal image for camera-based authentication, or a fingerprint for touch-based authentication. If it is determined that the biometric input can be used to complete a biometric authentication (YES at 504), the control circuitry provides the user who provided the biometric input access to an interface available through successful completion of the biometric authentication based on the authenticated user identity (e.g., user preferences and other stored information corresponding to a stored user profile that is associated with the authenticated user identity). If it is determined that the biometric input cannot be used to complete the biometric authentication (NO at 504), the control circuitry reviews profile settings for any or all stored user profiles found in either locate or remote storage accessible to the control circuitry for enabled alternative authentication methods. For example, stored profile data may be found in local storage such as storage 422 of computing device 402 or storage 438 of server 404 of FIG. 4.

If it is determined that an alternative authentication method has not been enabled (NO at 508), the control circuitry informs the user who provide the biometric input that the user's identity cannot be authenticated based on available authentication methods at 510. If it is determined that an alternative authentication method has been enabled (YES at 508), the control circuitry generates a prompt to the user to provide credentials or an input which would enable authentication of the user identity based on the alternative authentication method at 512. It should be noted that the determination at 508 and the subsequent prompt generation at 512 may be executed by biometric authentication process 800 of FIG. 8. In some embodiments, the control circuitry may default to a non-biometric alternative authentication method based on the determination that the first type of biometric authentication has failed. In some embodiments, the control circuitry may prompt a second type of biometric authentication before prompting a user to provide a non-biometric input for a non-biometric type of authentication.

At 514, in response to completing the alternative authentication method the control circuitry selectively modifies a biometric characteristic of a biometric signature, corresponding to the authenticated stored user profile, for processing subsequent attempt of the first type of authentication. In some embodiments, selectively modifying first includes comparing the characteristics of the biometric input to characteristics of the stored biometric signature. Based on the comparison, at least one difference between at least one characteristic of the biometric input and at least one respective characteristic of the biometric signature is identified. In some embodiments, the difference may be compared to a threshold value. Based on identified difference or differences, at least one characteristic is selected for modification for a transient period of time. The transient period of time in determined based on the ability of a user to provide a biometric input that enables biometric authentication based on the unmodified biometric signature. The comparison steps and the selective modification may be executed by starting at process block 602 in biometric authentication process 600 of FIG. 6, starting at process block 702 in biometric authentication process 700 of FIG. 7, starting at process block 802 in biometric authentication process 800 of FIG. 8, starting at process block 902 in process 900 of FIG. 9 or utilizing the comparison and selective modification process exemplified by any or all of FIGS. 10A-13.

Figure 6:
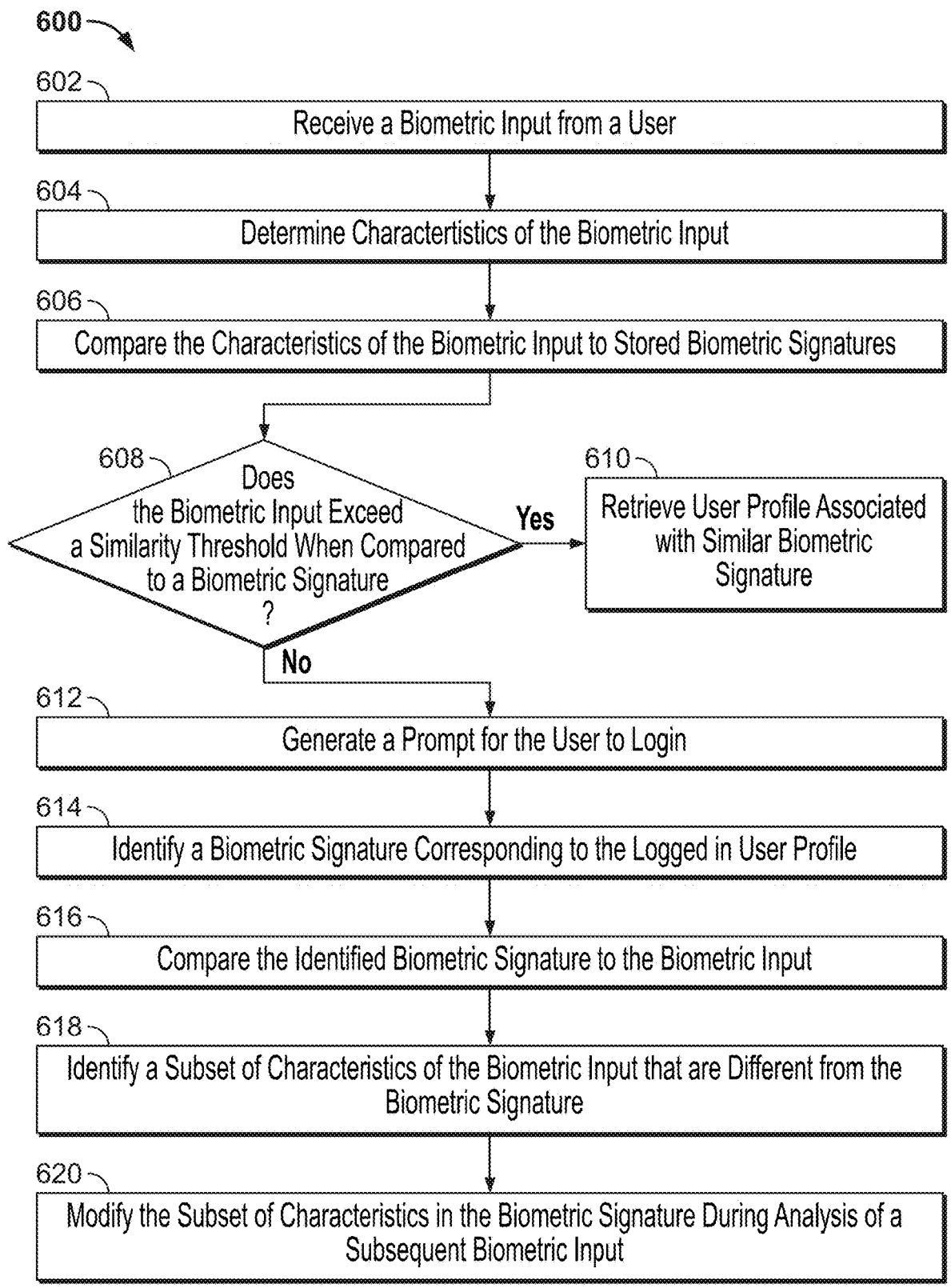
FIG. 6 is a flowchart representing an illustrative process for selectively modifying a biometric characteristic of a biometric signature, in accordance with some embodiments of the disclosure.

FIG. 6 depicts illustrative biometric authentication process 600 for enabling access to a stored user profile using a modified biometric signature despite an inability to generate a biometric input that enables authentication based on the stored biometric signature as determined by a comparison to a similarity threshold, in accordance with some disclosed methods and embodiments. For example, a user may provide a biometric input at 602 that is an audio input that may be used by one of the biometric authentication systems described herein for the purpose of attempting to authenticate a user identity in order to retrieve a stored user profile corresponding to the user identity. In other examples, the biometric input may be exemplified by any of the inputs provided and analyzed in FIGS. 1-3.

It should be noted that the process depicted in FIG. 6 or any step thereof could be performed on, or provided by, any device shown in FIG. 4 and can incorporate various user interfaces (e.g., display 410 of FIG. 4). For example, the process depicted in FIG. 6 may be executed by control circuitry 408 (FIG. 4) of user equipment exemplified by computing device 402. In addition, one or more steps of the process depicted in FIG. 6 may be incorporated into or combined with one or more steps of any other process or embodiment (e.g., starting at process block 502 in biometric authentication process 500 of FIG. 5, starting at process block 702 in biometric authentication process 700 of FIG. 7, starting at process block 802 in biometric authentication process 800 of FIG. 8, starting at process block 902 in process 900 of FIG. 9 or utilizing the comparison and selective modification processes exemplified by any or all of FIGS. 10A-13). In addition, FIGS. 1-3 provide depictions of exemplary embodiments of the processes described herein as executed by biometric authentication system 400.

At 602, a biometric input is received by the biometric authentication system for processing by the control circuitry (e.g., control circuitry 408 of FIG. 4) from a user. For example, the user may provide a voice pattern for audio-based biometric authentication, a face or retinal image for camera-based authentication, or a fingerprint for touch-based authentication. At 604, biometric characteristics of the biometric input are determined. For example, if the biometric input is an audio input some characteristics utilized for the purposes of performing a biometric authentication may include pitch, accent, pace, breathing pattern, word emphasis, and/or cadence. In some embodiments, the characteristics may correspond to the camera-based input such as features of a user's face including spacing of generic facial features, hair color, or other attributes. In some embodiments, the characteristics may correspond to a touch-based input such as a fingerprint which may rely on spacing and orientation of particular data points.

At 606, the characteristics determined at 604 are compared to characteristics of stored biometric signatures. In some embodiments, stored biometric signatures may be found in local storage such as storage 422 of computing device 402 or storage 438 of server 404 of FIG. 4. The comparison may be executed by starting at starting at process block 702 in biometric authentication process 700 of FIG. 7, starting at process block 802 in biometric authentication process 800 of FIG. 8, starting at process block 902 in process 900 of FIG. 9 or utilizing the comparison processes exemplified by any or all of FIGS. 10A-13. In some embodiments, the comparison of the respective biometric characteristics includes comparing each plurality of biometric characteristics to each other to determine a similarity value based on the measurable aspects of each respective biometric characteristics which may then be compared to a threshold similarity value. For example, a biometric characteristic may have a unit of measurement assigned to it (e.g., for a voice-based biometric input, a characteristic may be pitch which may have an assigned value of 120 Hz). The biometric signature and the biometric input may both have that characteristic captured and may have different values for each (e.g., the biometric input may have a value of 120 Hz and the biometric signature may have a stored value of 160 Hz). There may be a stored threshold similarity value to which the difference between the biometric input and the biometric signature may be compared (e.g., the stored threshold may be an absolute value such as 20 Hz). In this example, since the biometric input pitch of 120 Hz is different from the biometric signature of 160 Hz by 40 Hz, which exceeds the 20 Hz maximum allowable difference, the control circuitry may determine the first type of biometric authentication cannot be completed.

In some embodiments, the similarity threshold may be binary in nature. For example, for a voice-based biometric input one biometric characteristic may be accent. The control circuitry may determine the accent in the stored biometric signature and the accent in the biometric input either matches or does not match. In this example, if the accents are not the same, the control circuitry may determine the first type of biometric authentication cannot be completed. In some embodiments, the similarity value includes a series of weighted contributions of a series of threshold values and a series of binary values. For example, biometric characteristics for a voice-based input such as pitch, pace, and cadence may all be compared to a threshold difference value and may contribute to the determination that the biometric input and the biometric characteristic are sufficiently similar by contributing to half of the similarity value. Additionally, biometric characteristics for a voice-based input such as accent or word emphasis may be a binary match or does not match comparison to the biometric characteristic and these binary values may contribute to the other half of the similarity value. In this example, if the similarity value contributions in sum exceed a threshold similarity value the biometric authentication may determine the first type of biometric authentication can be completed.

If it is determined that the biometric input can be used to complete a biometric authentication based on a comparison to a threshold similarity value (YES at 608), the control circuitry provides the user, who provided the biometric input, access to an interface available through the biometric authentication based on the authenticated user identity at 610 (e.g., user preferences and other stored information corresponding to a stored user profile that is associated with the authenticated user identity). If it is determined that the biometric input cannot be used to complete the biometric authentication (NO at 608), the control circuitry reviews profile settings for any or all stored user profiles found in either local or remote storage accessible to the control circuitry for enabled alternative authentication methods to generate a prompt for the user to log in at 612. For example, stored profile data may be found in local storage such as storage 422 of computing device 402 or storage 438 of server 404 of FIG. 4. It should be noted that the determination at 608 and the subsequent prompt generation at 612 may be executed by biometric authentication process 800 of FIG. 8 as well as the various comparison methods depicted in FIGS. 10A-13. In some embodiments, the control circuitry may default to a non-biometric alternative authentication method based on the determination that the first type of biometric authentication has failed. In some embodiments, the control circuitry may prompt a second type of biometric authentication before prompting a user to provide a non-biometric input for a non-biometric type of authentication.

At 614, in response to completing the alternative authentication method the control circuitry identifies a biometric signature corresponding to the logged-in user profile and also matches a type of the biometric input (e.g., if a voice-based input is provided, a voice-based signature is identified). At 616, the control circuitry compares the biometric characteristics of the biometric input to the respective biometric characteristics of the biometric input. The comparison may reflect the similarity threshold comparison performed at 608. At 618, the control circuitry identifies a subset of biometric input characteristics that are different from the respective subset of biometric signature characteristics. In some embodiments, the difference is based on a threshold value as previously described or may be a binary difference, in that the control circuitry either determines they match or do no match. In response to identifying the subset of biometric input characteristics, at 620 the control circuitry selectively modifies a biometric characteristic of a biometric signature, corresponding to the authenticated stored user profile, for processing subsequent attempt of the first type of authentication.

In some embodiments, selectively modifying first includes comparing the characteristics of the biometric input to characteristics of the stored biometric signature. Based on the comparison, at least one difference between at least one characteristic of the biometric input and at least one respective characteristic of the biometric signature is identified. In some embodiments, the difference may be compared to a threshold value. Based on an identified difference or identified differences, at least one characteristic is selected for modification for a transient time period. The transient time period determined based on the ability of a user to provide a biometric input that enables biometric authentication based on the unmodified biometric signature. The comparison steps and the selective modification may be executed by starting at process block 514 in biometric authentication process 500 of FIG. 5, starting at process block 702 in biometric authentication process 700 of FIG. 7, starting at process block 802 in biometric authentication process 800 of FIG. 8, starting at process block 902 in process 900 of FIG. 9 or utilizing the comparison and selective modification processes exemplified by any or all of FIGS. 10A-13.

Figure 7:
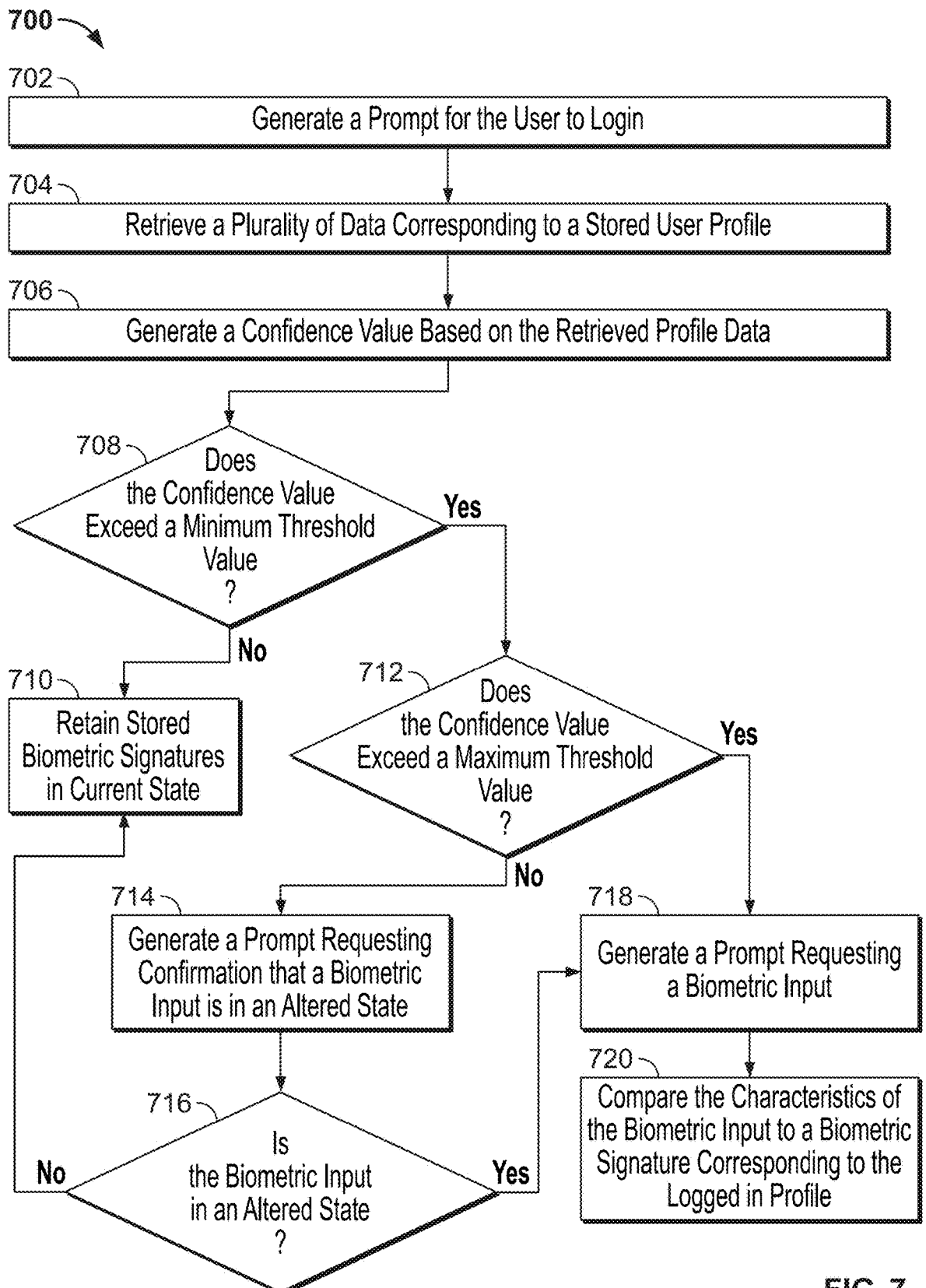
FIG. 7 is a flowchart representing an illustrative process for determining whether a biometric characteristic has changed, in accordance with some embodiments of the disclosure.

FIG. 7 depicts illustrative biometric authentication process 700 for generating a confidence value for determining that a user cannot provide a biometric input that enables successful completion of a particular type of biometric authentication, in accordance with some disclosed methods and embodiments. For example, a user may provide a biometric input in response to a prompt to log in at 702 that is an audio input that may be used by one of the biometric authentication systems described herein for the purpose of attempting to authenticate a user identity in order to retrieve a stored user profile corresponding to the user identity. In other examples, the biometric input may be exemplified by any of the inputs provided and analyzed in FIGS. 1-3.

It should be noted that the process depicted in FIG. 7 or any step thereof could be performed on, or provided by, any device shown in FIG. 4 and can incorporate various user interfaces (e.g., display 410 of FIG. 4). For example, the process depicted in FIG. 7 may be executed by control circuitry 408 (FIG. 4) of user equipment exemplified by computing device 402. In addition, one or more steps of the process depicted in FIG. 7 may be incorporated into or combined with one or more steps of any other process or embodiment (e.g., starting at process block 512 of biometric authentication process 500 of FIG. 5, starting at process block 612 in biometric authentication process 600 of FIG. 6, starting at process block 802 in biometric authentication process 808 of FIG. 8, starting at process block 902 in process 900 of FIG. 9 or utilizing the comparison and selective modification process exemplified by any or all of FIGS. 10A-13). In addition, FIGS. 1-3 provide depictions of exemplary embodiments of the processes described herein as executed by biometric authentication system 400.

At 702, the control circuitry (e.g., control circuitry 408 of FIG. 4) generates a prompt for a user to manually enter some form of profile credentials. In some embodiments, the control circuitry may have detected a failure in a first type of biometric authentication (e.g., a voice-based biometric input was received and the control circuitry was unable to identify a stored user profile based on the provided input). At 704, in response to receiving credentials for a stored user profile, the control circuitry retrieves a plurality of data corresponding to the stored user profile. For example, the plurality of data may be calendar data or messages corresponding to communications generated from the stored user profile. At 706, the control circuitry generates a confidence value based on the retrieved profile data. For example, the confidence value may correspond to a confidence that, based on the data, there is an indicium that a user cannot provide a biometric input that enables biometric authentication based on a particular stored biometric signature (e.g., there are is an appointment scheduled with a doctor and messages relating to the appointment that indicate the user's voice may have changed recently, thereby indicating the ability of the user to complete authentication by a voice-based input compromised for a transient period of time). In some embodiments, the confidence value may be a single numeric value that corresponds to a probability that a user in unable to provide a biometric input that enables authentication by a biometric signature in a stored user profile (e.g., 80% probability that the biometric input is altered). In some embodiments, the confidence value may be a dynamic value that gets updated based on subsequent inputs provided by a user.

At 708, the control circuitry compares the generated confidence value to a minimum confidence value. For example, the minimum confidence value may correspond to a 60% probability that a user is unable to provide a biometric input that enables authentication by a biometric signature in a stored user profile. If the control circuitry determines that the generated confidence value does not exceed the minimum threshold confidence value (NO at 708), the control circuitry retains the stored biometric signatures in their respective current states at 710, and will not rely on the confidence value for determining whether to selectively modify a stored biometric signature corresponding to a recent biometric input. If the control circuitry determines that the generated confidence value does exceed the minimum threshold confidence value (YES at 708), the control circuitry compares the generated confidence value to a maximum threshold confidence value at 712. For example, if the generated confidence value is 80%, then it would exceed a minimum confidence value of 60% and would then be compared to the maximum confidence value of 90% probability that a user is unable to provide a biometric input that enables authentication by a biometric signature in a stored user profile.

If the control circuitry determines the generated confidence value does not exceed a maximum threshold confidence value (NO at 712), the control circuitry generates a prompt requesting confirmation that a biometric input is in an altered state at 714. For example, the control circuitry may request input from a user confirming that the user's voice is in a state that prevents the user of a voice-based authentication method. If the user responds to the prompt that the user can generate a biometric input that enables authentication by the biometric authentication method of the first type (NO at 716), the control circuitry retains the stored biometric signatures in their respective current states at 710, and will not rely on the confidence value for determining whether to selectively modify a stored biometric signature corresponding to a recent biometric input.

If the user responds to the prompt that the user can generate a biometric input that enables authentication by the biometric authentication method of the first type (YES at 716), the control circuitry generates a prompt requesting a biometric input at 718. For example, if the control circuitry determines based on the confidence value that the user's voice might be altered and the user confirms their voice is altered the control circuitry requests a voice input for further analysis. At 720, once the user provides the additional requested biometric input the control circuitry compares biometric characteristics of the biometric input to corresponding biometric characteristics of a biometric signature of the same type in a stored user profile. The comparison may result in a selective modification of the biometric characteristics in the biometric signature, as depicted by the exemplary comparison and modification processes shown in FIGS. 10A-13.

If the control circuitry determines the generated confidence value does exceed a maximum threshold confidence value (YES at 712), the control circuitry generates a prompt requesting a biometric input at 718. For example, if the control circuitry determines based on the confidence value that the user's voice might be altered and the user confirms their voice is altered the control circuitry requests a voice input for further analysis. At 720, once the user provides the requested biometric input the control circuitry compares biometric characteristics of the biometric input to corresponding biometric characteristics of a biometric signature of the same type in a stored user profile. The comparison may result in a selective modification of the biometric characteristics in the biometric signature, as depicted by the exemplary comparison and modification processes shown in FIGS. 10A-13.

Figure 8:
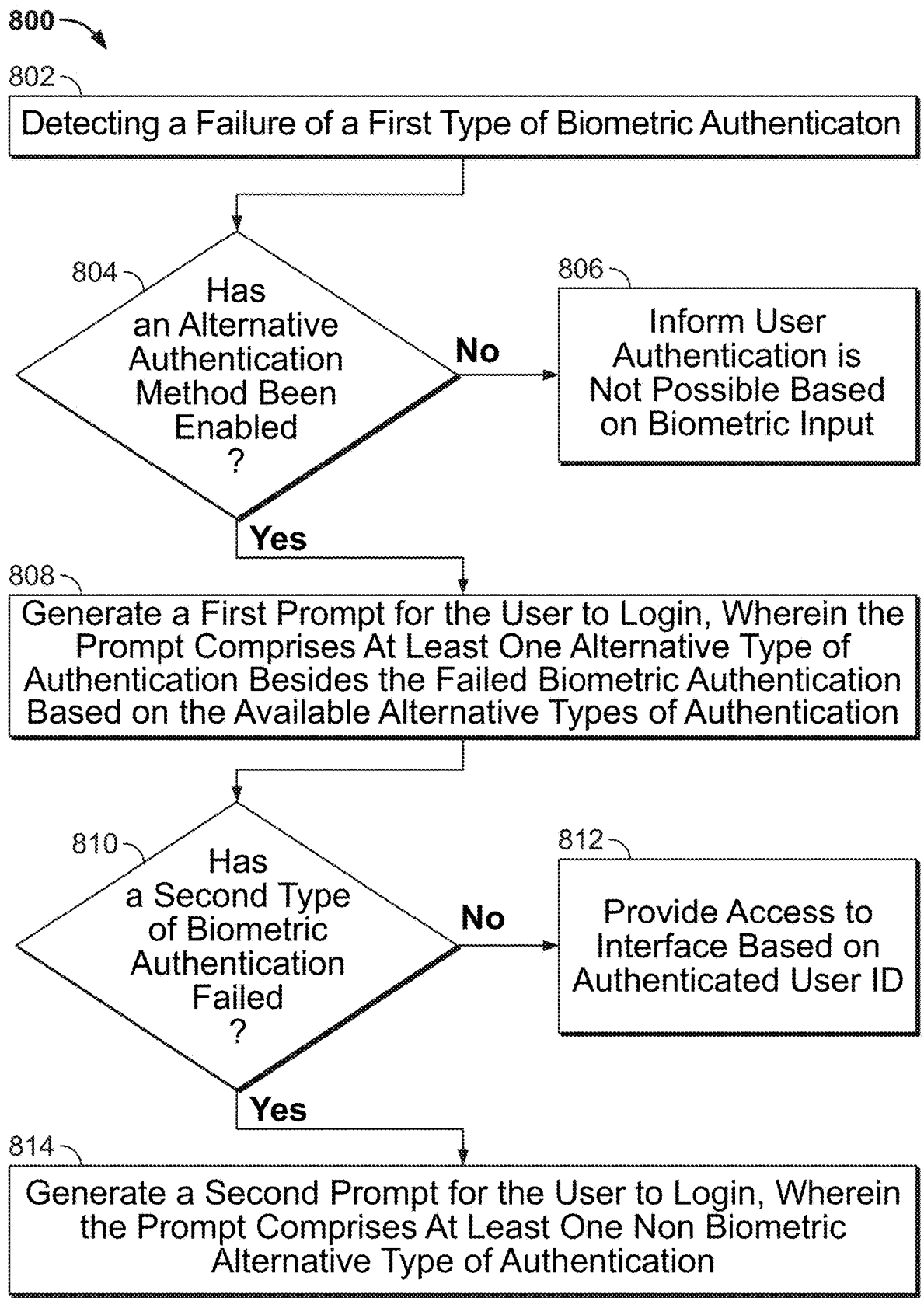
FIG. 8 is a flowchart representing an illustrative process for completing an alternative type of authentication after detecting a failure of a first type of biometric authentication, in accordance with some embodiments of the disclosure.

FIG. 8 depicts illustrative biometric authentication process 800 for prompting an alternative authentication method after detecting a failure of a first type of biometric authentication, in accordance with some disclosed methods and embodiments. For example, a user may provide a biometric input at 802 that is an audio input that may be used by one of the biometric authentication systems described herein for the purpose of attempting to authenticate a user identity in order to retrieve a stored user profile corresponding to the user identity. In other examples, the biometric input may be exemplified by any of the inputs provided and analyzed in FIGS. 1-3.

It should be noted that the process depicted in FIG. 8 or any step thereof could be performed on, or provided by, any device shown in FIG. 4 and can incorporate various user interfaces (e.g., display 410 of FIG. 4). For example, the process depicted in FIG. 8 may be executed by control circuitry 408 (FIG. 4) of user equipment exemplified by computing device 402. In addition, one or more steps of the process depicted in FIG. 8 may be incorporated into or combined with one or more steps of any other process or embodiment (e.g., starting at process block 502 in biometric authentication process 500 of FIG. 5, starting at process block 602 in biometric authentication process 600 of FIG. 6, starting at process block 702 in biometric authentication process 700 of FIG. 7, starting at process block 902 in process 900 of FIG. 9 or utilizing the comparison and selective modification processes exemplified by any or all of FIGS. 10A-13). In addition, FIGS. 1-3 provide depictions of exemplary embodiments of the processes described herein as executed by biometric authentication system 400.

At 802, the control circuitry (e.g., control circuitry 408 of FIG. 4) may detect a failure of a first type of biometric authentication based on a received biometric input. For example, a user may provide a voice-based biometric input and based on the various comparison methods described herein the control circuitry may determine the biometric input is not similar enough to a biometric signature of a stored profile to determine the authentication of the first type is possible. At 804, the control circuitry may review the stored user profile for an enabled alternative authentication method (e.g., a fingerprint authentication method or a credential entry-based authentication method). If the control circuitry determines that an alternative authentication method has not been enabled (NO at 804), the control circuitry may inform the user that authentication is not possible by the provided input at 806. If the control circuitry determines that an alternative authentication method has been enabled (YES at 804), the control circuitry may generate a first prompt to the user that includes instructions to provide an alternative input to perform a second type of authentication method at 808. In some embodiments, the second type of authentication method may be a second biometric authentication. (e.g., a voice-based authentication failed, and a prompt may be generated for a fingerprint authentication, assuming the fingerprint authentication method has been enabled).

If the control circuitry determines that the second type of biometric authentication has not failed (NO at 810), the control circuitry provides a user access to a user interface and preferences corresponding to the stored user profile based on the authenticated user at 812. If the control circuitry determines that the second type of biometric authentication has failed (YES at 810), the control circuitry generates a second prompt for the user to log in or authenticate the user identity by non-biometric alternative type of authentication at 814 (e.g., a voice-based authentication failed at 802, a fingerprint authentication failed at 810, and a credential entry based log in is requested in the generated prompt at 814).

Figure 9:
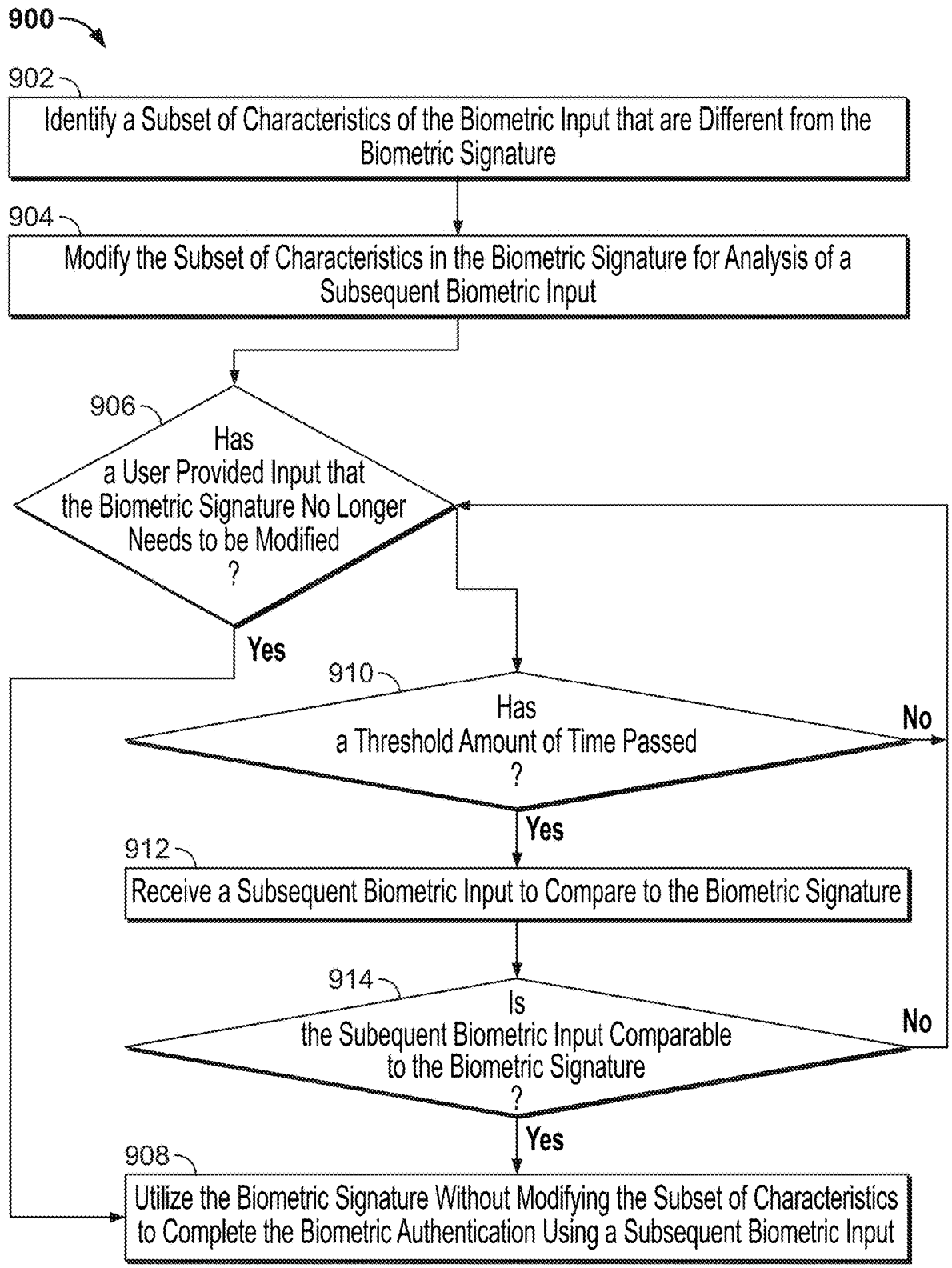
FIG. 9 is a flowchart representing an illustrative process for determining when to return the modified biometric characteristic of the biometric signature to a state prior to the selective modification, in accordance with some disclosed methods and embodiments.

FIG. 9 depicts illustrative biometric authentication process 900 for determining that the modified biometric characteristic of the biometric signature can be returned to an original state prior to the selective modification, in accordance with some disclosed methods and embodiments. For example, a user may provide a biometric input at 902 that is an audio input that may be used by one of the biometric authentication systems described herein for the purpose of attempting to authenticate a user identity in order to retrieve a stored user profile corresponding to the user identity and the control circuitry corresponding to the biometric authentication systems may determine to modify a biometric signature in a stored user profile based on the biometric input. In other examples, the biometric input may be exemplified by any of the inputs provided and analyzed in FIGS. 1-3. After a transient period of time, the control circuitry may be configured to return the selectively modified biometric signature back to an original state.

It should be noted that the process depicted in FIG. 9 or any step thereof could be performed on, or provided by, any device shown in FIG. 4 and can incorporate various user interfaces (e.g., display 410 of FIG. 4). For example, the process depicted in FIG. 9 may be executed by control circuitry 408 (FIG. 4) of user equipment exemplified by computing device 402. In addition, one or more steps of the process depicted in FIG. 9 may be incorporated into or combined with one or more steps of any other process or embodiment (e.g., starting at process block 514 in biometric authentication process 500 of FIG. 5, starting at process block 620 in biometric authentication process 600 of FIG. 6, starting at process block 702 in biometric authentication process 700 of FIG. 7, starting at process block 802 in biometric authentication process 800 of FIG. 8, or utilizing the comparison and selective modification process exemplified by any or all of FIGS. 10A-13). In addition, FIGS. 1-3 provide depictions of exemplary embodiments of the processes described herein as executed by biometric authentication system 400.

At 902, the control circuitry (e.g., control circuitry 408 of FIG. 4) identifies a subset of characteristics of the biometric input that includes characteristics that consist of different values than the respective biometric characteristics of a stored biometric signature. For example, the identification may be executed by any of the exemplary comparison and identification steps depicted in FIGS. 10A-13 (e.g., a set of characteristics of a voice-based input are compared to a set of characteristics of a voice-based signature and at least one of the characteristics of a voice-based input has a different value than the corresponding characteristic of the voice-based signature). At 904, the control circuitry modifies the subset of characteristics in the biometric signature for analysis of a subsequent biometric input of a same type. For example, the original biometric input may include a voice-based input that has a pitch value that does not match a pitch value in the stored biometric signature. The pitch value in the biometric signature may be modified to either not be used in a subsequent analysis of a new voice-based input or may be given a reduced weight in determining if the biometric signature may be authenticated by the new voice-based input.

After the modification is completed, the control circuitry continues to receive biometric inputs of the first type. Each subsequent biometric input may be analyzed to determine if it matches or exceeds a similarity threshold when compared to the biometric signature in the stored user profile utilizing any of the comparison methods described herein. If the control circuitry determines that a user has provided an input that indicates the original unmodified biometric signature can be utilized again for the first type of biometric authentication (YES at 906), the control circuitry utilizes the original biometric signature without the selective modifications from the analysis performed based on the preceding biometric input of the first type at 908. In some embodiments, the user may provide direct input to the control circuitry that their biometric input has returned to an original state. For example, the user may state their voice has returned to normal. In another example, the control circuitry performs the confidence value analysis from FIG. 7. In another example, the control circuitry may perform the similarity comparison for each new received biometric input of the first type to determine the user can provide the biometric input in a manner that enables the biometric authentication of the first type using the unmodified biometric signature in the stored user profile.

If the control circuitry determines that a user has not provided a biometric input that indicates the original unmodified biometric signature can be utilized again for the first type of biometric authentication (NO at 906), the control circuitry determines if a threshold amount of time has passed since the last review of the user's ability to provide a biometric input of the first type that enables biometric authentication of the first type at 910. For example, there may be a stored threshold amount of time based on the determination that the user's ability to provide a biometric input that enables authentication of the user by the first type of biometric authentication such as five days. If five days have not yet passed between the first biometric input that led to the biometric signature being selectively modified and the second biometric input, then the control circuitry continues to monitor for additional biometric inputs to perform a future comparison of characteristics at 906.

If the control circuitry determines a threshold amount of time has passed (YES at 910), the control circuitry receives a subsequent biometric input to perform the comparison analysis to the original biometric signature previously described at 912. If the subsequent biometric input is not comparable to the original biometric signature (NO at 914), the control circuitry continues to monitor for a user input that indicates the biometric signature no longer needs to be selectively modified at 906. If the subsequent biometric input is comparable to the original biometric signature (YES at 914), the control circuitry utilizes the original biometric signature without the selective modifications from the analysis performed based on the preceding biometric input of the first type at 908. In some embodiments, the user may provide direct input to the control circuitry that their biometric input has returned to an original state. For example, the user may state their voice has returned to normal. In another example, the control circuitry performs the confidence value analysis from FIG. 7. In another example, the control circuitry may perform the similarity comparison for each new received biometric input of the first type to determine the user can provide the biometric input in a manner that enables the biometric authentication of the first type using the unmodified biometric signature in the stored user profile.

FIG. 10A is an illustrative example of a collection of biometric characteristics of biometric signature 1000a utilized by the biometric authentic application for performing a first type of biometric authentication, in accordance with some disclosed methods and embodiments. In some embodiments, the application may utilize a slot matrix for determining elements of a user statement. For example, a user may provide a biometric input that is an audio input that may be used by one of the biometric authentication systems described herein for the purpose of attempting to authenticate a user identity using biometric signature 1000a in order to retrieve a stored user profile corresponding to the user identity. In other examples, the biometric input may be exemplified by any of the inputs provided and analyzed in FIGS. 1-3.

It should be noted that the biometric signature depicted in FIG. 10A or any alternative embodiment thereof may be analyzed by any process performed by, or provided to, any device shown in FIG. 4 and may incorporate various user interfaces (e.g., display 410 of FIG. 4). For example, the biometric signature depicted in FIG. 10A may be received and analyzed by control circuitry 408 (FIG. 4) of user equipment exemplified by computing device 402. In addition, one or more characteristics of the biometric signature depicted in FIG. 10A may be incorporated into or combined with one or more steps of any other process or embodiment (e.g., starting at process block 502 in biometric authentication process 500 of FIG. 5, starting at process block 602 in biometric authentication process 600 of FIG. 6, starting at process block 702 in biometric authentication process 700 of FIG. 7, starting at process block 802 in biometric authentication process 800 of FIG. 8, starting at process block 902 in process 900 of FIG. 9 or utilizing the comparison and selective modification process exemplified by any or all of FIGS. 10B-13). In addition, FIGS. 1-3 provide depictions of exemplary embodiments of the processes described herein as executed by biometric authentication system 400.

Biometric signature 1000a includes biometric signature characteristics 1002a. For example, biometric signature 1000a may be a voice-based signature which may be characterized by a set of characteristics such as pitch, accent, pace, breathing pattern, word emphasis, and/or cadence. In another embodiment, biometric signature 1000a may correspond to a different type of biometric input such as those depicted in FIGS. 2 and 3, which may have a different set of characteristics that would be useful for analysis of a biometric input as depicted in FIGS. 2 and 3. Each of biometric signature characteristics 1002a has a respective stored characteristic values 1004a. For example, the biometric characteristic pitch may have a stored value of 160 Hz. Prior to analysis of a subsequent biometric input, each of biometric signature characteristics 1002a has stored characteristics statuses for authentication 1006a. For example, biometric signature 1000a may not have had a failed authentication attempt and the status for each of biometric signature characteristics 1002a may be a status designating each characteristic "AVAILABLE," as depicted by stored characteristics statuses for authentication 1006a. In some embodiments, if the status is "AVAILABLE" then the corresponding biometric signature characteristic may be considered as part of any of the biometric authentication processes described herein.

FIG. 10B is an illustrative example of selective biometric characteristic modification 1000b. The biometric characteristics of a stored biometric signature are selectively modified by the control circuitry (e.g., control circuitry 408 of FIG. 4), in accordance with some disclosed methods and embodiments. For example, a user may provide a biometric input that is an audio input that may be used by one of the biometric authentication systems described herein for the purpose of attempting to authenticate a user identity in order to retrieve a stored user profile corresponding to the user identity based on selective biometric characteristic modification 1000b. In other examples, the biometric input may be exemplified by any of the inputs provided and analyzed in FIGS. 1-3.

It should be noted that the biometric signature and biometric input depicted in FIG. 10B or any alternative embodiment thereof may be analyzed by any process performed by, or provided to, any device shown in FIG. 4 and may incorporate various user interfaces (e.g., display 410 of FIG. 4). For example, the biometric signature and biometric input depicted in FIG. 10B may be received and analyzed by control circuitry 408 (FIG. 4) of user equipment exemplified by computing device 402. In addition, one or more characteristics of the biometric signature and biometric input depicted in FIG. 10B may be incorporated into or combined with one or more steps of any other process or embodiment (e.g., starting at process block 502 in biometric authentication process 500 of FIG. 5, starting at process block 602 in biometric authentication process 600 of FIG. 6, starting at process block 702 in biometric authentication process 700 of FIG. 7, starting at process block 802 in biometric authentication process 800 of FIG. 8, starting at process block 902 in process 900 of FIG. 9 or utilizing the comparison and selective modification process exemplified by any or all of FIGS. 10A and 11-13). In addition, FIGS. 1-3 provide depictions of exemplary embodiments of the processes described herein as executed by biometric authentication system 400.

Selective biometric characteristic modification 1000b requires reception by biometric authentication system 400 of FIG. 4 of biometric input characteristics 1008. For example, a biometric input may be a voice-based input which may be characterized by a set of characteristics such as pitch, accent, pace, breathing pattern, word emphasis, and/or cadence. In another embodiment, the biometric input may correspond to a different type of biometric input such as those depicted in FIGS. 2 and 3, which may have a different set of characteristics that would be useful for analysis of a biometric input as depicted in FIGS. 2 and 3. Each of biometric input characteristics 1008 has a respective biometric input characteristic depicted as values 1010. For example, the biometric input characteristic pitch may have a received value of 120 Hz. Prior to analysis of a subsequent biometric input, each of biometric signature characteristics 1002b also has stored characteristic status for authentication 1006b. Each of biometric signature characteristics 1002b may have respective stored characteristic values 1004b. For example, the biometric characteristic pitch may have a stored value of 160 Hz.

As a result of an analysis of the biometric input, each of biometric signature characteristics 1002b also has a stored characteristic status for authentication 1006b. For example, the biometric signature may have had a failed authentication attempt, and the status for some of biometric signature characteristics 1002b may be a status designating some of the characteristics are "SUPPRESSED" as depicted by stored characteristics statuses for authentication 1006b. In some embodiments, if the status is "SUPPRESSED" then the corresponding biometric signature characteristic may not be considered as part of any of the biometric authentication processes described herein. The status "SUPPRESSED" may be assigned based on an analysis when a received characteristic does not match a corresponding stored characteristic or is not within a threshold value, as depicted by biometric authentication process 600 of FIG. 6.

FIG. 11 is an illustrative example biometric characteristic comparison 1100. Biometric input characteristic values 1106 may be compared to biometric signature characteristic values 1104 for the purpose of determining if the control circuitry can complete a first type of biometric authentication, in accordance with some disclosed methods and embodiments. For example, a user may provide a biometric input that includes biometric characteristics 1102 that correspond to an audio input that may be used by one of the biometric authentication systems described herein for the purpose of attempting to authenticate a user identity in order to retrieve a stored user profile corresponding to the user identity. In other examples, the biometric input may be exemplified by any of the inputs provided and analyzed in FIGS. 1-3.

It should be noted that biometric characteristic comparison 1100 depicted in FIG. 11 or any step thereof could be performed on, or provided by, any device shown in FIG. 4 and can incorporate various user interfaces (e.g., display 410 of FIG. 4). For example, biometric characteristic comparison 1100, depicted in FIG. 11, may be executed by control circuitry 408 (FIG. 4) of user equipment exemplified by computing device 402. In addition, one or more steps of that biometric characteristic comparison 1100 depicted in FIG. 11 may be incorporated into or combined with one or more steps of any other process or embodiment (e.g., starting at process block 502 in biometric authentication process 500 of FIG. 5, starting at process block 602 in biometric authentication process 600 of FIG. 6, starting at process block 702 in biometric authentication process 700 of FIG. 7, starting at process block 802 in biometric authentication process 800 of FIG. 8, starting at process block 902 in process 900 of FIG. 9 or utilizing the comparison and selective modification process exemplified by any or all of FIGS. 10A, 10B, 12, and 13). In addition, FIGS. 1-3 provide depictions of exemplary embodiments of the processes described herein as executed by biometric authentication system 400.

Biometric characteristic comparison 1100 includes identifying a set of biometric characteristics such as biometric signature characteristics 1102. For example, for a voice-based input, biometric signature characteristics 1102 may include pitch, accent, pace, breathing pattern, word emphasis, and/or cadence. In other embodiments, biometric signature characteristics 1102 may include a set of characteristics corresponding to different types of biometric signatures such as those depicted in FIGS. 2 and 3. For each of biometric signature characteristics 1102, the control circuitry (e.g., control circuitry 408 of FIG. 4) identifies corresponding stored characteristic values 1104 for each of biometric signature characteristics 1102. Additionally, the control circuitry identifies corresponding received input characteristic values 1106 identified from received biometric input. Each value of stored characteristic values 1104 and received input characteristic values 1106 may be either numeric or descriptive, depending on the characteristic each value corresponds to. For example, the characteristic accent may be a descriptive term (e.g., the received input value is "UNKNOWN" and the stored value is "New England") whereas the characteristic pitch may be a numeric value (e.g., the received input value is 120 Hz and the stored value is 160 Hz).

Difference 1108 represents the result of the comparison of stored characteristic values 1104 and received input characteristic values 1106. For example, the characteristic accent may have a binary "MATCH" or "NO MATCH" difference value based on the comparison of respective descriptive values (e.g., the received input value is "UNKNOWN" and the stored value is "New England" resulting in a difference value of "NO MATCH"), whereas the characteristic pitch results in a numeric difference value (e.g., the received input value is 120 Hz and the stored value is 160 Hz, resulting in a difference value of −40 Hz). Once difference 1108 is determined for each respective characteristic, the control circuitry proceeds to further compare the values to a threshold or may determine to suppress or deemphasize each respective characteristic, in accordance with some embodiments of this disclosure.

FIG. 12 shows illustrative biometric characteristic comparison 1200 between a collection of biometric input characteristics and a collection of respective biometric characteristics of an exemplary biometric signature being compared to a threshold value for the purpose of determining if the control circuitry (e.g., control circuitry 408 of FIG. 4) can complete a first type of biometric authentication, in accordance with some disclosed methods and embodiments.

For example, a user may provide a biometric input that is an audio input that may be used by one of the biometric authentication systems described herein for the purpose of attempting to authenticate a user identity in order to retrieve a stored user profile corresponding to the user identity. In other examples, the biometric input may be exemplified by any of the inputs provided and analyzed in FIGS. 1-3.

It should be noted that biometric characteristic comparison 1200 depicted in FIG. 12 or any step thereof could be performed on, or provided by, any device shown in FIG. 4 and can incorporate various user interfaces (e.g., display 410 of FIG. 4). For example, biometric characteristic comparison 1200 depicted in FIG. 12 may be executed by control circuitry 408 (FIG. 4) of user equipment exemplified by computing device 402. In addition, one or more steps of biometric characteristic comparison 1200 depicted in FIG. 12 may be incorporated into or combined with one or more steps of any other process or embodiment (e.g., starting at process block 504 of biometric authentication process 500 of FIG. 5, starting at process block 602 in biometric authentication process 600 of FIG. 6, starting at process block 702 in biometric authentication process 700 of FIG. 7, starting at process block 802 in biometric authentication process 800 of FIG. 8, starting at process block 902 in process 900 of FIG. 9 or utilizing the comparison and selective modification process exemplified by any or all of FIGS. 10A-11 and 13). In addition, FIGS. 1-3 provide depictions of exemplary embodiments of the processes described herein as executed by biometric authentication system 400.

Biometric characteristic comparison 1200 includes identifying a set of biometric characteristics such as biometric signature characteristics 1202. For example, for a voice-based input, biometric signature characteristics 1202 may include pitch, accent, pace, breathing pattern, word emphasis, and/or cadence. In other embodiments, biometric signature characteristics 1202 may include a set of characteristics corresponding to different types of biometric signatures such as those depicted in FIGS. 2 and 3. For each of biometric signature characteristics 1202, the control circuitry (e.g., control circuitry 408 of FIG. 4) identifies corresponding stored characteristic values 1204 for each of biometric signature characteristics 1202. Additionally, the control circuitry identifies corresponding received input characteristic values 1206 identified from received biometric input. Each value of stored characteristic values 1104 and received input characteristic values 1206 may be either numeric or descriptive, depending on the characteristic each value corresponds to. For example, the characteristic accent may be a descriptive term (e.g., the received input value is "UNKNOWN" and the stored value is "New England") whereas the characteristic pitch may be a numeric value (e.g., the received input value is 120 Hz and the stored value is 160 Hz).

Difference 1208 represents the result of the comparison of stored characteristic values 1204 and received input characteristic values 1206. For example, the characteristic accent may have a binary "MATCH" or "NO MATCH" difference value based on the comparison of respective descriptive values (e.g., the received input value is "UNKNOWN" and the stored value is "New England" resulting in a difference value of "NO MATCH") whereas the characteristic pitch results in a numeric difference value (e.g., the received input value is 120 Hz and the stored value is 160 Hz resulting in a difference value of −40 Hz). Once difference 1208 is determined for each respective characteristic, the control circuitry proceeds to further compare the values to a threshold. Threshold values 1210 are a set of stored values that the control circuitry stores for analysis to determine which of biometric signature characteristics 1202 to selectively modify. For example, the threshold value for a binary difference value may indicate that a respective signature may be suppressed if there is no match between the stored and received input characteristic values (e.g., the received accent "UNKNOWN" does not match the stored accent "New England" which meets the "NO MATCH" threshold). In another example, the threshold value may be an absolute value for a difference between numeric values stored for respective biometric signature characteristics (e.g., the received pitch value of 120 Hz is more than a 20 Hz difference from stored pitch value 160 Hz).

In response to comparing difference 1208 to threshold values 1210, the control circuitry assigns to each of biometric signature characteristics 1202 respective stored characteristic statuses 1212. For example, the biometric signature may have had a failed authentication attempt and the status for some of biometric signature characteristics 1202 may be a status designating some of the characteristics are "SUPPRESSED" as depicted by stored characteristic statuses 1212. In some embodiments, if the status is "SUPPRESSED," then the corresponding biometric signature characteristic may not be considered as part of any of the biometric authentication processes described herein. The status "SUPPRESSED" may be assigned based on an analysis when a received characteristic does not match a corresponding stored characteristic or is not within a threshold value, as depicted by biometric authentication process 600 of FIG. 6. In another example, if the status is "AVAILABLE," then the corresponding biometric signature characteristic may be considered as part of any of the biometric authentication processes described herein. In some embodiments, there may be a third status of "MODIFIED," when a characteristic is modified to enable its use for subsequent authentication attempts of the first type of biometric authentication. The modified status may correspond to either a different threshold being used for comparison or the particular characteristic having a greater weight contributing to the method of authentication (e.g., relying more on some characteristics as opposed to others).

FIG. 13 depicts selective modification process 1300. A collection of biometric input characteristics are compared to a collection of respective biometric characteristics of a biometric signature, each of which has a respective emphasis factor, for the purpose of determining if the control circuitry (e.g., control circuitry 408 of FIG. 4) can complete a first type of biometric authentication and selectively modifying the collection of respective biometric characteristics of the biometric signature, in accordance with some disclosed methods and embodiments. For example, a user may provide a biometric input that is an audio input that may be used by one of the biometric authentication systems described herein for the purpose of attempting to authenticate a user identity in order to retrieve a stored user profile corresponding to the user identity and, based on that biometric input, a stored biometric signature may be modified for processing subsequent biometric inputs of the same type. In other examples, the biometric input may be exemplified by any of the inputs provided and analyzed in FIGS. 1-3.

It should be noted that selective modification process 1300 depicted in FIG. 13 or any step thereof could be performed on, or provided by, any device shown in FIG. 4 and can incorporate various user interfaces (e.g., display 410 of FIG. 4). For example, the selective modification process 1300 depicted in FIG. 13 may be executed by control circuitry 408 (FIG. 4) of user equipment exemplified by computing device 402. In addition, one or more steps of the selective modification process 1300 depicted in FIG. 13 may be incorporated into or combined with one or more steps of any other process or embodiment (e.g., starting at process block 514 of biometric authentication process 500 of FIG. 5, starting at process block 620 in biometric authentication process 600 of FIG. 6, starting at process block 702 in biometric authentication process 700 of FIG. 7, starting at process block 802 in biometric authentication process 800 of FIG. 8, starting at process block 908 in process 900 of FIG. 9 or utilizing the comparison and selective modification process exemplified by any or all of FIGS. 10A-12). In addition, FIGS. 1-3 provide depictions of exemplary embodiments of the processes described herein as executed by biometric authentication system 400.

Selective modification process 1300 starts by receiving a biometric input that includes biometric input characteristics 1302 and received input characteristics values 1304. For example, for a voice-based input, biometric signature characteristics 1302 may include pitch, accent, pace, breathing pattern, word emphasis, and/or cadence. In other embodiments, biometric signature characteristics 1302 may include a set of characteristics corresponding to different types of biometric signatures such as those depicted in FIGS. 2 and 3. The biometric input is compared to a biometric signature of a same type corresponding to a stored user profile. The biometric signature includes biometric signature characteristics 1306, stored characteristic values 1308, threshold values 1310, and stored weights 1312. For example, each of biometric characteristics 1306 may correspond to each of biometric input characteristics 1302.

Threshold values 1310 are a set of stored values that the control circuitry (e.g., control circuitry 408 of FIG. 4) stores for analysis to determine which of biometric signature characteristics 1306 to selectively modify. For example, the threshold value for a binary difference value may indicate that a respective signature may be suppressed if there is no match between the stored and received input characteristic values (e.g., the received accent "UNKNOWN" does not match the stored accent "New England" which meets the "NO MATCH" threshold). In another example, the threshold value may be an absolute value for a difference between numeric values stored for respective biometric signature characteristics (e.g., the received pitch value of 120 Hz is more than a 20 Hz different from stored pitch value 160 Hz).

Stored weights 1312 are a set of stored values that the control circuitry utilizes to determine a weighted influence of a particular biometric characteristic in comparing a received input to a stored signature. For example, the sum of stored emphasis factors may be a value of 1 and there may be a minimum value that needs to be surpassed to enable authentication may be a value of 0.7 depending on how many characteristics are enabled for authentication. Based on a comparison between received input characteristic values 1304 and stored characteristic values 1308, a set of difference values 1316 are determined for each of biometric signature characteristics 1314 which correspond to biometric signature characteristics 1306. Each of difference values 1316 are then compared to each of threshold values 1310. In response to determining each which of difference values 1316 are outside of threshold values 1310, modified biometric signature characteristics 1318 are determined which retain corresponding stored characteristic values 1320 with stored weights 1322. Modified biometric signature characteristics 1318 correspond to a subset of biometric signature characteristics 1306 for which difference values 1316 were within threshold values 1310. In some embodiments, some of biometric signature characteristics 1306 may be suppressed entirely as shown in FIG. 13 by modifying respective stored weights 1322 to be a value of 0 or by simply blocking the characteristic from being considered in a subsequent analysis of a biometric input of a same type. In some embodiments, stored weights 1322 may be different values from stored weights 1312. For example, the control circuitry may apply a larger contributing weight to the characteristics that are shown to be within a threshold value and may apply a smaller contributing weight to the characteristics that are outside a threshold value.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

While some portions of this disclosure may refer to "convention" or examples, any such reference is merely to provide context to the instant disclosure and does not form any admission as to what constitutes the state of the art.

What is claimed is:

1. A method comprising:
   detecting a failure of a first type of biometric authentication;
   in response to detecting the failure of the first type of biometric authentication, providing a prompt requesting performance of an alternative type of authentication;
   receiving input in relation to the prompt, and completing the alternative type of authentication;
   in response to completing the alternative type of authentication and without providing a subsequent prompt requesting performance of the first type of biometric authentication, selectively modifying, in a stored user profile, a biometric characteristic of a biometric signature for processing a subsequent attempt of the first type of biometric authentication; and
   providing for display a notification indicating that the selective modification has been performed and indicating how the biometric characteristic of the biometric signature has been modified.

2. The method of claim 1, wherein detecting the failure of the first type of biometric authentication comprises:
   receiving a biometric input signal comprising a biometric characteristic;
   comparing the biometric characteristic of the biometric input signal to the biometric characteristic of the biometric signature in the stored user profile; and
   determining, based on the comparing, that the biometric characteristic of the biometric input signal is not within a threshold similarity value of the biometric characteristic of the biometric signature in the stored user profile.

3. The method of claim 1, wherein completing the alternative type of authentication comprises:
   retrieving at least one user setting in the stored user profile;
   determining, based on the at least one user setting, at least one authentication signature in the stored user profile; and
   receiving an alternative input signal that meets or exceeds a similarity threshold when compared to the at least one authentication signature in the stored user profile, wherein the alternative input signal is used to complete the alternative type of authentication.

4. The method of claim 3, further comprising:
   in response to determining, based on the at least one user setting, the at least one authentication signature in the stored user profile, generating the prompt comprised of instructions to input the alternative input signal corresponding to the at least one authentication signature in the stored user profile.

5. The method of claim 1, wherein selectively modifying, in the stored user profile, the biometric characteristic of the biometric signature for processing the subsequent attempt of the first type of biometric authentication comprises:
   comparing one or more biometric characteristics of a biometric input signal, associated with the detected failure, to one or more respective biometric characteristics of the biometric signature;
   determining, based on the comparing, that one or more of the biometric characteristics of the biometric input signal are different from one or more of the corresponding biometric characteristics of the biometric signature, wherein the difference between the one or more of the biometric characteristics of the biometric input signal and the one or more of the corresponding biometric characteristics of the biometric signature matches or exceeds a difference threshold; and
   selecting, based on the determining, the one or more of the corresponding biometric characteristics of the biometric signature for modification.

6. The method of claim 5, further comprising:
   modifying an emphasis factor corresponding to the one or more of the biometric characteristics of the biometric signature selected for modification.

7. The method of claim 1, wherein the biometric characteristic is one of a plurality of biometric characteristics of the biometric signature, the method further comprising:
   completing the first type of biometric authentication for the subsequent attempt by utilizing one or more of the plurality of biometric characteristics and preventing utilization of one or more other ones of the plurality of biometric characteristics.

8. The method of claim 1, further comprising:
   retrieving data associated with the stored user profile; and
   generating, based on the data, a confidence value corresponding to the biometric characteristic, wherein the confidence value indicates a probability that utilizing the biometric characteristic would cause the first type of biometric authentication to fail;
   comparing the confidence value to a threshold confidence value;
   determining, based on the comparing, that the confidence value matches or exceeds the threshold confidence value; and
   in response to determining that the confidence value matches or exceeds the threshold confidence value, selecting the biometric characteristic of the biometric signature for modification for processing the subsequent attempt of the first type of biometric authentication.

9. A method comprising:
detecting a failure of a first type of biometric authentication;
retrieving data associated with a stored user profile;
generating, based on the data, a confidence value corresponding to a biometric signature, wherein the confidence value indicates a probability that utilizing a biometric characteristic of the biometric signature would cause the first type of biometric authentication to fail;
comparing the confidence value to a threshold confidence value;
determining, based on the comparing, that the confidence value matches or exceeds the threshold confidence value;
in response to determining that the confidence value matches or exceeds the threshold confidence value, generating a notification indicating that the first type of biometric authentication has failed;
in response to detecting the failure of the first type of biometric authentication, completing an alternative type of authentication; and
in response to completing the alternative type of authentication, selectively modifying, in the stored user profile, the biometric characteristic of the biometric signature for processing a subsequent attempt of the first type of biometric authentication,
wherein comparing the confidence value to the threshold confidence value further comprises:
comparing the confidence value to a minimum threshold confidence value;
determining, based on the comparing, that the confidence value matches or exceeds the minimum threshold confidence value; and
in response to determining that the confidence value matches or exceeds the minimum threshold confidence value, generating a prompt requesting user confirmation that the biometric characteristic has changed.

10. A system comprising:
a communication port;
a memory storing instructions; and
control circuitry communicably coupled to the memory and the communication port and configured to execute the instructions to:
detect a failure of a first type of biometric authentication;
in response to detecting the failure of the first type of biometric authentication, provide a prompt requesting performance of an alternative type of authentication;
receive input in relation to the prompt, and complete the alternative type of authentication;
in response to completing the alternative type of authentication and without providing a subsequent prompt requesting performance of the first type of biometric authentication, selectively modify, in a stored user profile, a biometric characteristic of a biometric signature for processing a subsequent attempt of the first type of biometric authentication; and
provide for display a notification indicating that the selective modification has been performed and indicating how the biometric characteristic of the biometric signature has been modified.

11. The system of claim 10, wherein the control circuitry is further configured to detect the failure of the first type of biometric authentication by:
receiving, via the communication port, a biometric input signal comprising a biometric characteristic;
comparing the biometric characteristic of the biometric input signal to the biometric characteristic of the biometric signature in the stored user profile; and
determining, based on the comparing, that the biometric characteristic of the biometric input signal is not within a threshold similarity value of the biometric characteristic of the biometric signature in the stored user profile.

12. The system of claim 10, wherein the control circuitry is configured to complete the alternative type of authentication by:
retrieving, from the memory, at least one user setting in the stored user profile;
determining, based on the at least one user setting, at least one authentication signature in the stored user profile; and
receiving, via the communication port, an alternative input signal that meets or exceeds a similarity threshold when compared to the at least one authentication signature in the stored user profile, wherein the alternative input signal is used to complete the alternative type of authentication.

13. The system of claim 12, wherein the control circuitry is further configured to:
in response to determining, based on the at least one user setting, the at least one authentication signature in the stored user profile, generate the prompt comprised of instructions to input the alternative input signal corresponding to the at least one authentication signature in the stored user profile.

14. The system of claim 10, wherein the control circuitry is further configured to selectively modify, in the stored user profile, the biometric characteristic of the biometric signature for processing the subsequent attempt of the first type of biometric authentication by:
comparing one or more biometric characteristics of a biometric input signal, associated with the detected failure, to one or more respective biometric characteristics of the biometric signature;
determining, based on the comparing, that one or more of the biometric characteristics of the biometric input signal are different from one or more of the corresponding biometric characteristics of the biometric signature, wherein the difference between the one or more of the biometric characteristics of the biometric input signal and the one or more of the corresponding biometric characteristics of the biometric signature matches or exceeds a difference threshold; and
selecting, based on the determining, the one or more of the corresponding biometric characteristics of the biometric signature for modification.

15. The system of claim 14, wherein the control circuitry is further configured to:
modify an emphasis factor corresponding to the one or more of the biometric characteristics of the biometric signature selected for modification.

16. The system of claim 10, wherein the control circuitry is configured to recognize the biometric characteristic is one of a plurality of biometric characteristics of the biometric signature, and is further configured to:
complete the first type of biometric authentication for the subsequent attempt by utilizing one or more of the plurality of biometric characteristics and preventing utilization of one or more other ones of the plurality of biometric characteristics.

17. The system of claim 10, wherein the control circuitry is further configured to:
- retrieve, from the memory, data associated with the stored user profile; and
- generate, based on the data, a confidence value corresponding to the biometric characteristic, wherein the confidence value indicates a probability that utilizing the biometric characteristic would cause the first type of biometric authentication to fail;
- compare the confidence value to a threshold confidence value;
- determine, based on the comparing, that the confidence value matches or exceeds the threshold confidence value; and
- in response to determining that the confidence value matches or exceeds the threshold confidence value, select the biometric characteristic of the biometric signature for modification for processing the subsequent attempt of the first type of biometric authentication.

18. The system of claim 10, wherein the control circuitry is further configured to:
- retrieve, from the memory, data associated with the stored user profile; and
- generate, based on the data, a confidence value corresponding to the biometric signature, wherein the confidence value indicates a probability that utilizing the biometric characteristic would cause the first type of biometric authentication to fail;
- compare the confidence value to a threshold confidence value;
- determine, based on the comparing, that the confidence value matches or exceeds the threshold confidence value; and
- in response to determining that the confidence value matches or exceeds the threshold confidence value, generate a notification indicating that the first type of biometric authentication has failed.

19. The system of claim 18, wherein the control circuitry configured to compare the confidence value to the threshold confidence value is further configured to:
- in response to determining that the confidence value matches or exceeds the threshold confidence value, perform the selective modifying, in the stored user profile, of the biometric characteristic of the biometric signature for processing the subsequent attempt of the first type of biometric authentication.

\* \* \* \* \*